(12) United States Patent
Terao

(10) Patent No.: US 10,657,139 B2
(45) Date of Patent: May 19, 2020

(54) INFORMATION PROCESSING APPARATUS AND NON-TRANSITORY COMPUTER READABLE MEDIUM FOR DISTRIBUTED RESOURCE MANAGEMENT

(71) Applicant: FUJI XEROX CO., LTD., Tokyo (JP)

(72) Inventor: Taro Terao, Yokohama (JP)

(73) Assignee: FUJI XEROX CO., LTD., Tokyo (JP)

(*) Notice: Subject to any disclaimer, the term of this patent is extended or adjusted under 35 U.S.C. 154(b) by 205 days.

(21) Appl. No.: 15/257,124

(22) Filed: Sep. 6, 2016

(65) Prior Publication Data
US 2017/0277754 A1 Sep. 28, 2017

(30) Foreign Application Priority Data
Mar. 23, 2016 (JP) .................. 2016-058398

(51) Int. Cl.
*G06F 16/2457* (2019.01)
*G06F 16/23* (2019.01)

(52) U.S. Cl.
CPC ...... *G06F 16/2457* (2019.01); *G06F 16/2379* (2019.01)

(58) Field of Classification Search
None
See application file for complete search history.

(56) References Cited

U.S. PATENT DOCUMENTS 6,438,549 B1 * 8/2002 Aldred .............. G06F 17/30595
707/640
7,496,922 B2 * 2/2009 Muramatsu .......... H04W 88/02
709/203
8,892,687 B1 * 11/2014 Call .................. H04L 29/06972
709/217
2004/0143582 A1 * 7/2004 Vu .................... G06F 17/30961
2010/0319067 A1 * 12/2010 Mohanty ............ G06F 21/6218
726/21

(Continued)

FOREIGN PATENT DOCUMENTS

JP 2005-235005 A 9/2005
JP 2011-090415 A 5/2011

(Continued)

OTHER PUBLICATIONS

Jan. 7, 2020 Office Action in Japanese Patent Application No. 2016-058398.

*Primary Examiner* — Christopher J Raab
(74) *Attorney, Agent, or Firm* — Oliff PLC

(57) ABSTRACT

An information processing apparatus includes a first management unit that manages information of an object, of which at least one of a parent or a child is determined, by a memory within the information processing apparatus, a second management unit that manages information of an object, of which at least one of a parent or a child is determined, by a memory accessible from plural information processing apparatuses, a receiving unit that receives a request which is intended for a target object managed by the first management unit or the second management unit, and a processing unit that performs processing corresponding to the request on information of the target object based on a comparison result between an owner object for which the piece of authority information is authorized and an object which is a parent of the authority object.

7 Claims, 21 Drawing Sheets

(56) References Cited

U.S. PATENT DOCUMENTS

| | | | | |
|---|---|---|---|---|
| 2011/0105029 | A1* | 5/2011 | Takayashiki | H04W 8/245 |
| | | | | 455/41.2 |
| 2011/0320498 | A1* | 12/2011 | Flor | G06F 17/30625 |
| | | | | 707/797 |
| 2012/0023138 | A1* | 1/2012 | Egan | G06F 17/30117 |
| | | | | 707/783 |
| 2014/0122471 | A1* | 5/2014 | Houston | G06F 17/3089 |
| | | | | 707/731 |
| 2015/0026799 | A1 | 1/2015 | Terao | |
| 2017/0010919 | A1* | 1/2017 | Yerfule | H04L 67/322 |

FOREIGN PATENT DOCUMENTS

| | | |
|---|---|---|
| JP | 5447722 B1 | 3/2014 |
| JP | 2014-153746 A | 8/2014 |
| JP | 2015-022390 A | 2/2015 |
| JP | 2015-162057 A | 9/2015 |
| JP | 2015-162058 A | 9/2015 |

\* cited by examiner

FIG. 4

| OBJECT ID | PROTOTYPE ID | VALIDATION FLAG | ATTRIBUTE | | | | |
|---|---|---|---|---|---|---|---|
| aaaaaaaa | ffffffff | T | type | etag | 00000000 | name | master Content | time | 2015-1-1 10:00:00 | ⋮ |
| bbbbbbbb | ffffffff | T | type application/json | etag | 11111111 | name | master Content Token | time | 2015-1-1 10:10:00 | ⋮ |
| cccccccc | aaaaaaaa | T | type | etag | 22222222 | name | child Content | time | 2015-1-1 10:20:00 | ⋮ |
| dddddddd | aaaaaaaa | F | type application/json | etag | 33333333 | name | master Content Token | time | 2015-1-1 10:30:00 | ⋮ |

FIG. 5

| etag (ID) | VALUE |
|---|---|
| 0000 0000 | {"HEADER": ····, "BODY": ····  } |
| 1111 1111 | {"owner": 'aaaaaaaa', "client": 'aaaaaaaa', "scope": 'crud scope'} |
| 2222 2222 | {         } |
| 3333 3333 | {"owner": 'aaaaaaaa', "client": 'cccccccc', "scope": 'crud scope'} |
|  |  |

INFORMATION PROCESSING APPARATUS AND NON-TRANSITORY COMPUTER READABLE MEDIUM FOR DISTRIBUTED RESOURCE MANAGEMENT

CROSS-REFERENCE TO RELATED APPLICATIONS

This application is based on and claims priority under 35 USC 119 from Japanese Patent Application No. 2016-058398 filed on Mar. 23, 2016.

BACKGROUND

Technical Field

The present invention relates to an information processing apparatus and a non-transitory computer readable medium.

SUMMARY

According to an aspect of the invention, there is provided an information processing apparatus including: a first management unit that manages information of an object, of which at least one of a parent or a child is determined, by a memory within the information processing apparatus; a second management unit that manages information of an object, of which at least one of a parent or a child is determined, by a memory accessible from a plurality of information processing apparatuses; a receiving unit that receives a request which includes a designation of an authority object, which is an object associated with authority information, and is intended for a target object managed by the first management unit or the second management unit; and a processing unit that performs processing corresponding to the request on information of the target object based on a comparison result in authority between an owner object which is an object for which the authority information is authorized and an object which is a parent of the authority object. In a case where the request corresponds to creation processing, update processing, or discarding processing of information of an object, the processing unit performs processing corresponding to the request using the first management unit. In a case where the request corresponds to processing for reflecting information, which is created, updated, or discarded, within a memory managed by the first management unit into a memory managed by the second management unit, the processing unit performs the processing for reflecting using the second management unit.

BRIEF DESCRIPTION OF DRAWINGS

Exemplary embodiments of the present invention will be described in detail based on the following figures, wherein:

FIG. 4 is a diagram illustrating an example of an object management table;

FIG. 5 is a diagram illustrating an example of a value management table;

DETAILED DESCRIPTION

Hereinafter, examples of preferred exemplary embodiments in implementing the present invention will be described based on the drawings.

1. Description of Function Equipped in Information Processing Apparatus 100

Figure 1:
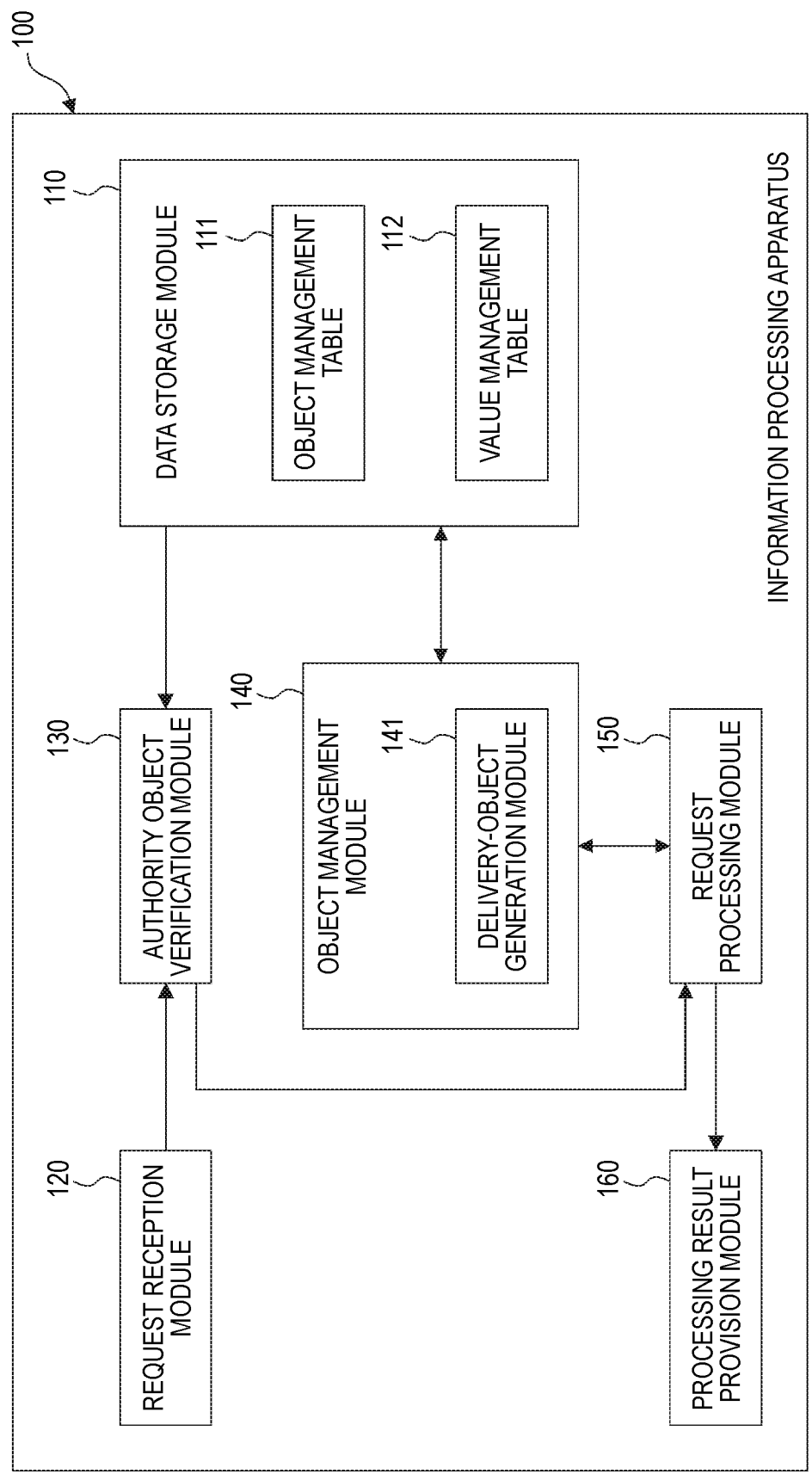
FIG. 1 is a configuration diagram conceptually illustrating modules in a configuration example of the present exemplary embodiment.

FIG. 1 is a configuration diagram conceptually illustrating modules in a configuration example of the present exemplary embodiment.

A module generally refers to logically divisible pieces of software (a computer program) or hardware or the like. Accordingly, the module in the present exemplary embodiment refers not only to a module in a computer program but also to a module in a hardware configuration. Therefore, in the present exemplary embodiment, a computer program that functions as the modules (a program for causing a computer to execute respective procedures, a program for causing a computer to function as respective units, a program for causing a computer to implement respective functions), a system, and a method are also described. For the convenience of explanation, the expressions of "stores", "is stored", and other expressions equivalent to the expressions are used. However, in a case where an exemplary embodiment is a computer program, these expressions mean that something is caused to be stored in a storage device or control is performed such that something is stored in the storage device. The module may have a one-to-one correspondence with a function. However, in mounting the modules, a single module may be configured by a single program, plural modules may be configured by a single program, and in an opposite manner, a single module may be configured by plural programs. Furthermore, plural modules may be executed by a single computer or a single module may be executed by plural computers in a distributed or parallel environment. Other modules may be included in a single module. In the following, the expression "connection" is also used in a case of a logical connection (sending and receiving of data, issuing of instructions, reference relationship between data, or the like) in addition to a physical connection. The expression "predetermined" is used to include the meaning that matters are determined before processing regarded as a target is performed, and matters are determined based on the situation and the state at that time or determined based on the situation and the state until that time before the processing regarded as the target is performed even after the processing in the present exemplary embodiment is started as well as before the processing in the present exemplary embodiment is started. In a case where there are plural "predetermined values", the predetermined values may be respectively different values or two or more (also including all the values) of the predetermined values may be the same. The description signifying that "In a case of A, it is regarded as B" is used to signify that "It is determined whether it is A, and when it is determined that it is A, it is regarded as B". However, a case where the determination as to whether it is A is unnecessary is excluded.

A system or an apparatus is configured in such a way that plural computers, hardware, apparatuses or the like are connected to each other by a communication unit such as a network (including communication connection on one-to-one correspondence), and may be implemented by a single computer, hardware, apparatus or the like. The "apparatus" and the "system" are interchangeably used herein as having the same meaning. The "system" does not include a social "mechanism" (a social system) that is merely an artificial arrangement.

Information regarded as a target is read from the storage device for each processing by each module or for each processing in a case where plural processing is performed in the module and a processing result is written into the storage device after the processing is performed. Accordingly, description of the reading from the storage device before the processing and the writing into the storage device after the processing may be omitted. Here, the storage device may include a hard disk, a random access memory (RAM), an external storage medium, a storage device through a communication line, a register within a central processing unit (CPU) or the like.

An information processing apparatus 100 which is an exemplary embodiment, as illustrated in an example of FIG. 1, includes a data storage module 110, a request reception module 120, an authority object verification module 130, an object management module 140, a request processing module 150, and a processing result provision module 160. The information processing apparatus 100 refers to a descendent object of master data but not the master data itself, provides a data item of the master data regarding a data item which is not included in the descendent object, provides a data item of the descendent object regarding a data item which is included in the descendent object, and thus contents to be provided regarding a single piece of the master data may be individually controlled.

The data storage module 110 includes an object management table 111 and a value management table 112, and is connected with the authority object verification module 130 and the object management module 140.

The request reception module 120 is connected with the authority object verification module 130.

The authority object verification module 130 is connected with the data storage module 110, the request reception module 120, and the request processing module 150.

The object management module 140 includes a delivery-object generation module 141 and is connected with the data storage module 110 and the request processing module 150.

The request processing module 150 is connected with the authority object verification module 130, the object management module 140, and the processing result provision module 160.

The processing result provision module 160 is connected with the request processing module 150.

The data storage module 110 manages information of a prototype-based object. The prototype-based object includes an authority object which is associated with authority information and is called an access token. The prototype-based object is an alterable (mutable) object and is typically identified by an ID generated in a random manner.

Figure 3:
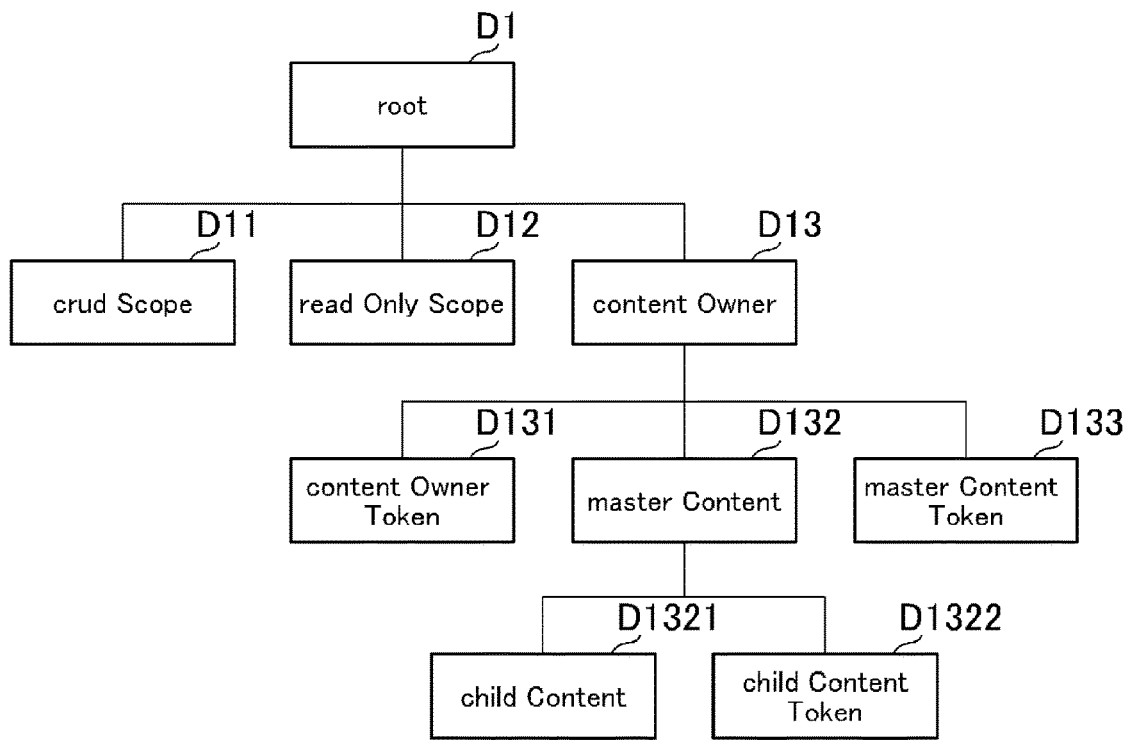
FIG. 3 is a diagram illustrating a specific example of a prototype-based object.

In FIG. 3, a specific example of a prototype-based object group (object tree) managed by the information processing apparatus 100 is illustrated. In the example illustrated in FIG. 3, each node represents an object and an edge connecting the nodes represents a parent-child relationship by prototype inheritance.

As illustrated in FIG. 3, a "crud Scope" object D11, a "read Only Scope" object D12, and a "content owner" object D13 are provided as child objects of a "root" object D1. Furthermore, a "content Owner Token" object D131, a "master Content" object D132, and a "master Content Token" object D133 are provided as child objects of the "content Owner" object D13. A "child Content" object D1321 and a "child Content Token" object D1322 are provided as child objects of the "master Content" object D132.

In the example illustrated in FIG. 3, the "crud scope" object D11 corresponds to a scope which permits a range (that is, create, read, update, and delete) of create, read, update, and delete (CRUD) and the "read Only Scope" object D12 corresponds to a scope which permits only the read.

Furthermore, the "content Owner" object D13 corresponds to an owner of the "master Content" object D132. A "content Owner Token" object D131 corresponds to a token for which the "content Owner" object D13 performs the CRUD and is a token which regards the "content Owner" as an owner, regards the "content Owner" as a client (authority transfer destination), and regards the "crud scope" as a scope.

The "master Content" object D132 corresponds to master data and the "master Content Token" object D133 corresponds to a token for preparing a child of the master data. The "master Content Token" object D133 is a token which regards the "master Content" as an owner, regards the "master Content" as a client (authority transfer destination), and regards the "crud Scope" as a scope.

The "child Content" object D1321 corresponds to a child delivery-object and the "child Content Token" object D1322 corresponds to a token for updating the "child Content" object D1321. The "child Content" object D1321 is a token which regards the "master Content" as an owner, regards the "child Content" as a client (authority transfer destination), and regards the "crud Scope" as a scope.

In the exemplary embodiment, the data storage module 110 includes the object management table 111 and the value management table 112, and stores information of the prototype-based object in the object management table 111 and the value management table 112 to be managed.

FIG. 4 and FIG. 5 illustrate an example of the object management table 111 and an example of the value management table 112, respectively.

As illustrated in FIG. 4, in the object management table 111, an object ID which is identification information of the prototype-based object, an prototype ID which is identification information of a parent (prototype) object of the object, a validation flag indicating whether the object is valid or not (T indicates validity and F indicates invalidity), and object attribute information are stored in association with each other. The object attribute information includes a type which indicates an object type, an etag which represents the identification information of a data object in which data contents of the object are stored, a name in which an object name is stored, and a time which represents an object generation date and time. A data configuration of the prototype-based object is not limited to an example illustrated in FIG. 4 and may also be configured to include elements other than the above-described elements. The flag which indicates whether the object is valid or not may be handled as attribute information which represents an invalidation date and time. In this case, a certain node is invalidated and thus all nodes of a partial tree in which the node is a root node may be collectively invalidated in order to inherit the prototype.

As illustrated in FIG. 5, a value is in association with an etag in the value management table 112. For example, the value is an arbitrary octet array and a value of the etag may be set as a hash value of the octet array.

For example, when the etag indicates an object corresponding to contents, information, for example, regarding an item of "HEADER" or "BODY" is stored as a value of the etag. For example, regarding the content which has a first object as a parent and has a second object as a child, of the first object in a case where information is stored in the "HEADER" or the "BODY" as the value of the etag of the first object and information is not stored in the "HEADER" or the "BODY" as the value of the etag of the second object, and the information stored in the "HEADER" or the "BODY" of the first object is used as the content of the second object when referring to the content of the second object. In a case where the information stored in the "HEADER" or the "BODY" exists in the contents of the second object, the information stored in the "HEADER" or the "BODY" is used as the content of the second object.

For example, when the etag indicates an access token, information having a type of {"owner": object ID of owner (owner), "client": object ID of client (client), "scope": authorized processing range} is included as the value of the etag. Although an access token is attached to a processing request received from a terminal device, information of the owner, client, or scope is specified by verifying the access token. The owner may be handled as a processing requester and the client may be handled as a proxy requester for processing.

The request reception module 120 receives a request from a terminal device 250 which will be described later using the example of FIG. 2. For example, the request reception module 120 may receive a request, which is related to processing of the object managed by the data storage module 110, from the terminal device 250. The request reception module 120 may receive information of the access token pertaining to the request along with the request from the terminal device 250. In this case, the request reception module 120 may receive a request in an HTTP request type from the terminal device 250, for example.

The authority object verification module 130 acquires information of an authority object (access token) pertaining to the request received by the request reception module 120 and verifies the acquired authority object. For example, the authority object verification module 130 may obtain the information of the access token from an Authorization field of the HTTP request and if a cookie including the information of the access token exists, the information of the access token may be obtained from the cookie.

The authority object verification module 130 verifies whether the acquired information of the access token (authority object) is valid or not. In the following, a specific example of verification processing performed by the authority object verification module 130 will be described.

First, the authority object verification module 130 determines (propriety of a first condition) whether an ID of the access token is included in the object management table 111 managed by the data storage module 110 or not. In a case where the ID is not included in the table, the authority object verification module 130 determines that the verification is failed.

Next, in a case where the first condition is satisfied, the authority object verification module 130 determines (propriety of a second condition) whether a data type of the access token (type) is a predetermined type (that is, application/json) or not. In a case where the data type is not the predetermined type, the authority object verification module 130 determines that the verification is failed. That is, in a case where the value, which is stored in the value management table 112, regarding the etag of the access token is not a predetermined type (data type which designates owner, client, or scope), the authority object verification module 130 determines that the verification is failed.

Next, in a case where the second condition is satisfied, the authority object verification module 130 acquires a value (value of owner, client, or scope) of the value of the access token and determines (propriety of a third condition) whether the value of each of the owner, the client, or the scope is data managed by the data storage module 110 or not. In a case where the value is not the data managed by the data storage module 110, the authority object verification module 130 determines that the verification is failed.

Next, in a case where the third condition is satisfied, the authority object verification module 130 acquires information of a prototype of the access token from the data storage module 110 and determines (propriety of a fourth condition) whether the prototype of the access token matches with the owner of access token or is included in the prototype chain (a path obtained by connecting a parent of the owner, a parent of a parent of the owner, and an ancestor of the owner in this order) of the owner. In a case where either the prototype of the access token does not match with the owner of access token or is not included in the prototype chain, the authority object verification module 130 determines that the verification is failed. The prototype chain may be a link formed by following a parent of the object and a parent of the parent of the object in a recursive manner. In a case where the first condition to the four condition are satisfied, the authority object verification module 130 may determine that the verification is successful.

The authority object verification module 130 notifies the verification result, the information of the scope (range of processing) authorized by the access token, and the received request to the request processing module 150.

The request processing module 150 controls processing for the request received by the request reception module 120 based on the verification result regarding the access token (authority object) acquired for the request received by the request reception module 120 and is notified from the authority object verification module 130, and the scope (range of processing) authorized for the received access token. For example, in a case where the verification result regarding the access token pertaining to the request received by the request reception module 120 is verification failure, the request processing module 150 may output an error to the processing result provision module 160 by regarding the processing pertaining to the request as unacceptable processing. In a case where the verification result regarding the access token pertaining to the request received by the request reception module 120 is verification success, the request processing module 150 processes the request received by the request reception module 120 based on an authorized scope regarding the access token received in relation to the request and outputs the processing result to the processing result provision module 160.

For example, the request processing module 150 requests the object management module 140 to perform creation, read, update and deletion of an object based on the received request and receives the processing result from the object management module 140.

Specifically, in a case where the received request corresponds to creation of a delivery-object regarding the master data, the request processing module 150, the request processing module 150 may request the object management module 140 to create a child object (or descendent object) of the master data (object) and transmits an object ID of the created child object (or descendent object), as a processing result, to the terminal device 250 through the processing result provision module 160.

The object management module 140 manages information of the object managed by the data storage module 110. For example, the object management module 140 performs processing such as an addition, read, update, deletion of information to the object management table 111 and the value management table 112 based on the request received from the request processing module 150.

The object management module 140 includes a delivery-object generation module 141 and creates the delivery-object which is a child (or descendent) of the master data based on a creation request for the delivery-object received from the request processing module 150.

The object management module 140 reads information of the delivery-object based on a read request for the delivery-object received from the request processing module 150. Regarding a data item in which the delivery-object is not included, the object management module 140 refers to information of a data item of an object of a parent (or ancestor) of the delivery-object and returns the information as information of the delivery-object.

The object management module 140 updates contents of the delivery-object based on an update request for the delivery-object received from the request processing module 150. The object management module 140 deletes the delivery-object based on a deletion request for the delivery-object received from the request processing module 150.

The processing result provision module 160 provides the processing result by the request processing module 150 to the terminal device 250 which is a request source of the request. For example, in a case where the processing request received by the request reception module 120 corresponds to the creation of the delivery-object, the processing result provision module 160 may provide the object ID of the created delivery-object to the terminal device 250. For example, in a case where the processing request received by the request reception module 120 corresponds to the read of the delivery-object, the processing result provision module 160 may provide read information of (that is, contents data) the delivery-object to the terminal device 250. For example, in a case where the processing request received by the request reception module 120 corresponds to the update or the deletion of the delivery-object, the processing result provision module 160 may provide success/failure information of the update or the deletion of the delivery-object to the terminal device 250.

2. Description of System Configuration

Figure 2:
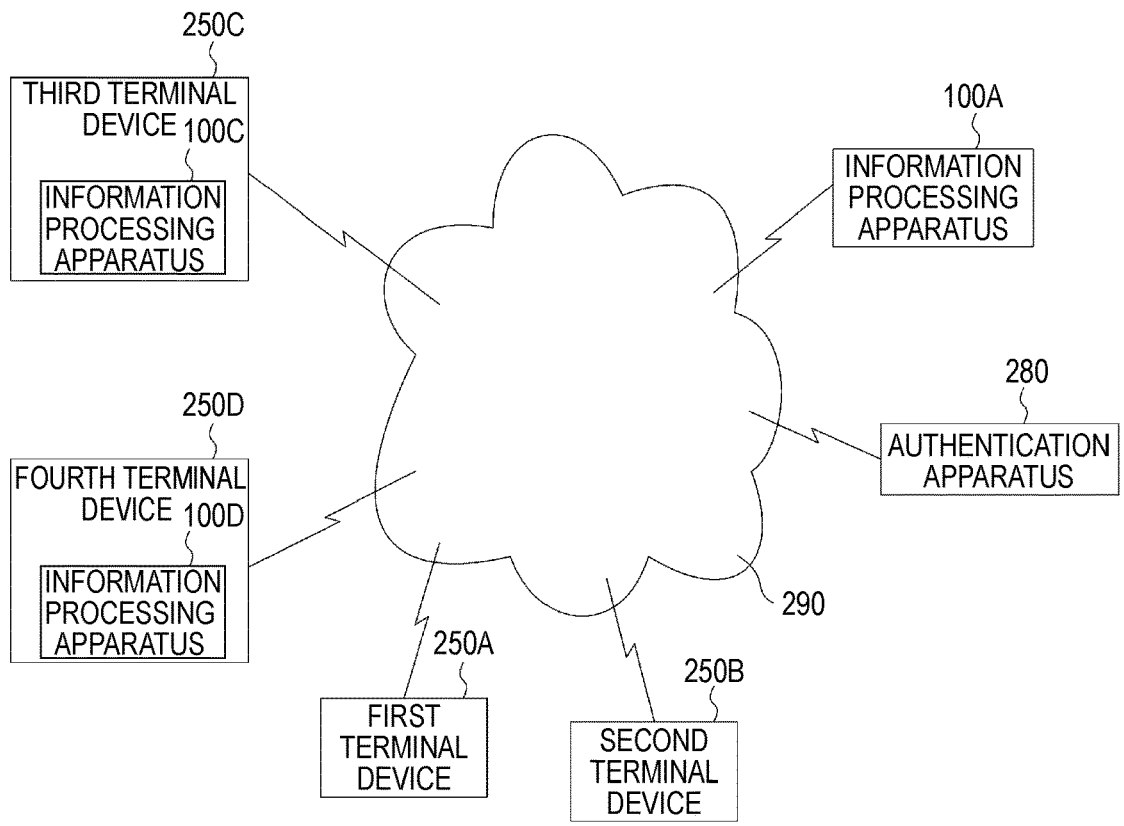
FIG. 2 is an explanatory diagram illustrating a configuration example of a system using the exemplary embodiment.

FIG. 2 is an explanatory diagram illustrating a configuration example of a system using the exemplary embodiment.

An information processing apparatus 100A, a first terminal device 250A, a second terminal device 250B, a third terminal device 250C, a fourth terminal device 250D, and an authentication apparatus 280 are connected with each other through a communication line 290. The third terminal device 250C includes an information processing apparatus 100C. The fourth terminal device 250D includes an information processing apparatus 100D. The communication line 290 may be a wired communication network, a wireless communication network, or a combination of the wired communication network and the wireless communication network, and may be, for example, the Internet and the Ethernet as a communication infrastructure. The function by the information processing apparatus 100 may be implemented as a cloud service.

An example of the first terminal device 250A and the second terminal device 250B that do not include the information processing apparatus 100 indicates a case of using the information processing apparatus 100A by only a remote operation. An example of the third terminal device 250C and the fourth terminal device 250D that include the information processing apparatus 100 indicates a case of using the information processing apparatus 100A at a remote operation and a case of using the information processing apparatus 100C and the information processing apparatus 100D that are local apparatuses. The description from [1] to [4] mainly describes the use of the information processing apparatus 100A by the first terminal device 250A and the second terminal device 250B. The description from [5] describes the use in a remote side (information processing apparatus 100A) by the third terminal device 250C and the fourth terminal device 250D and the use in a local side (information processing apparatus 100C and information processing apparatus 100D).

The information processing apparatus 100 manages a prototype-based object. The prototype-based object is an object having a single parent object (prototype) except for a root object which exists singly in a cluster of prototype-based objects. The root object does not have a prototype of itself.

When an object A is a prototype of an object B, the object B is also referred to as an artifact of the object A. The cluster of all prototype-based objects is represented in a tree structure by the prototype relationship between the objects. When the tree structure constituted with the objects is not broken, the prototype may be reconnected to alter the tree structure.

Furthermore, the object managed by the information processing apparatus 100 may have an attribute and a value of the attribute. In a representational state transfer (REST) architecture style, an object and a value may be referred to as the resource and the representation, respectively. The object may include an object representing pure identity which is simply formed only of an object identifier and a prototype, an object which represents data having a value of an arbitrary content type, an access token which is credential certifying an access qualification, or an object representing an entity a resource owner which is an owner of the object or an application (client) which performs access to the object under authorization of the resource owner. These objects are included in a single tree structure. The access token may be referred to as an object associated with authority information.

In a case where a request which presents an access token is received and the access token is verified as valid, the information processing apparatus 100 processes the received request in a range of authority specified based on the access token. For example, the range of authority specified by the access token is includes an authorization (or unauthorization) for any of a preparation (addition) of an object, referring to contents of the object, update of the object, deletion of the object, or the like. For example, the information processing apparatus 100 performs the addition, update, the read of information, the deletion of the object to be managed, or the like according to the request received from the terminal device 250.

The information processing apparatus 100 may manage the content that is master data for delivery created based on the request from the first terminal device 250A. The information processing apparatus 100 creates an object which is a child of the contents which is the master data, based on the request from the first terminal device 250A. The first terminal device 250A delivers information of the child object of the master data but not the master data itself to the second terminal device 250B. An addition, update, deletion of the contents, or the like may be allowed individually for the child object of the master data and the addition, update, the master data which is a parent is not influenced by the deletion of the content.

3. Description on an Example of Processing

Next, description will be made on an example of processing performed by an information processing system in detail based on the sequence diagrams illustrated in FIG. 6 to FIG. 12.

3.1. Creation Processing of a Delivery-Object

First, description will be made on an example of creation processing of an access token for delivery performed by the first terminal device 250A and the information processing apparatus 100 in detail based on the sequence diagram illustrated in FIG. 6. First, in a flow of FIG. 6, it is regarded that the first terminal device 250A includes an access token T1 (content Owner Token) for which the scope allowing creation, acquisition, update, and deletion of the child object regarding the parent object (content Owner) of the master data (master Content) is determined.

Figure 6:
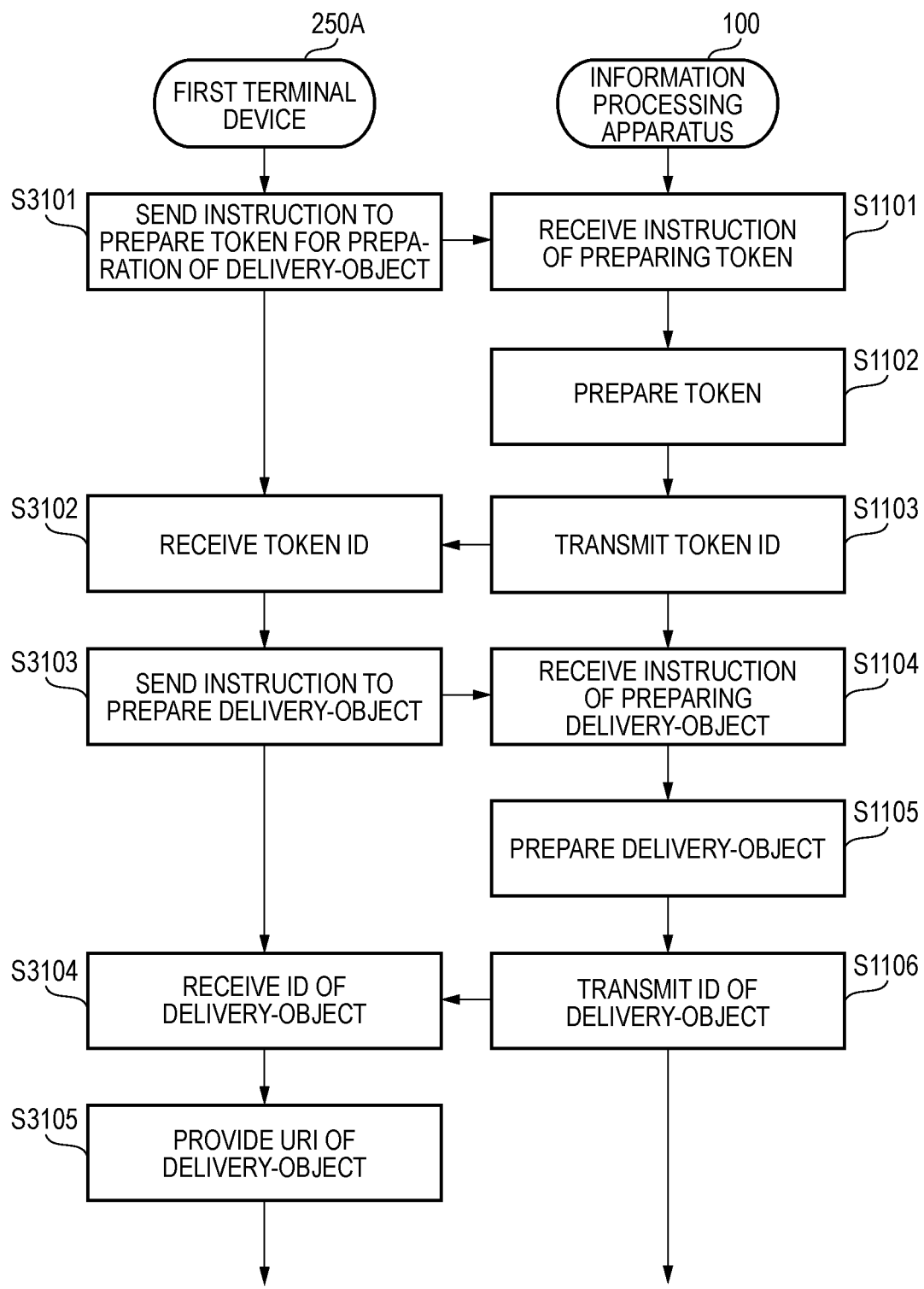
FIG. 6 is a sequence diagram of generation processing of an access token for delivery.

As illustrated in FIG. 6, the first terminal device 250A instructs the information processing apparatus 100 to prepare the access token T2 (master Content Token) for preparing the child object of the master data (master Content) using the access token T1 (S3101).

When an instruction to prepare the access token T2 is received from the first terminal device 250A (S1101), the information processing apparatus 100 verifies the access token T1. In a case where the verification is successful, the information processing apparatus 100 prepares the access token T2 (S1102). The information processing apparatus 100 transmits an ID (object ID) of the prepared access token T2 to the first terminal device 250A (S1103).

The first terminal device 250A receives the ID of the access token T2 transmitted from the information processing apparatus 100 (S3102).

Next, the first terminal device 250A instructs the information processing apparatus 100 to prepare a child object of the master data as the delivery-object of the master data using the access token T2 (S3103).

When an instruction to prepare a delivery-object is received from the first terminal device 250A (S1104), the information processing apparatus 100 verifies an access token T2. In a case where the verification is successful, the information processing apparatus 100 prepares the delivery-object, that is, the child object of the master data (S1105). The information processing apparatus 100 transmits an ID (object ID) of the prepared delivery-object to the first terminal device 250A (S1106).

The first terminal device 250A receives the ID of the delivery-object transmitted from the information processing apparatus 100 (S3104). The first terminal device 250A provides a URI, which is used for referring to the content of the delivery-object which is created based on the ID of the delivery-object, to the second terminal device 250B (S3105).

The first terminal device 250A may also provide information of the access token T2 used for updating the content of the delivery-object, in addition to the URI, to the second terminal device 250B.

The description that has been made so far is an example of the creation processing of the delivery-object.

3.2. Display Processing of Contents of a Delivery-Object

Figure 7:
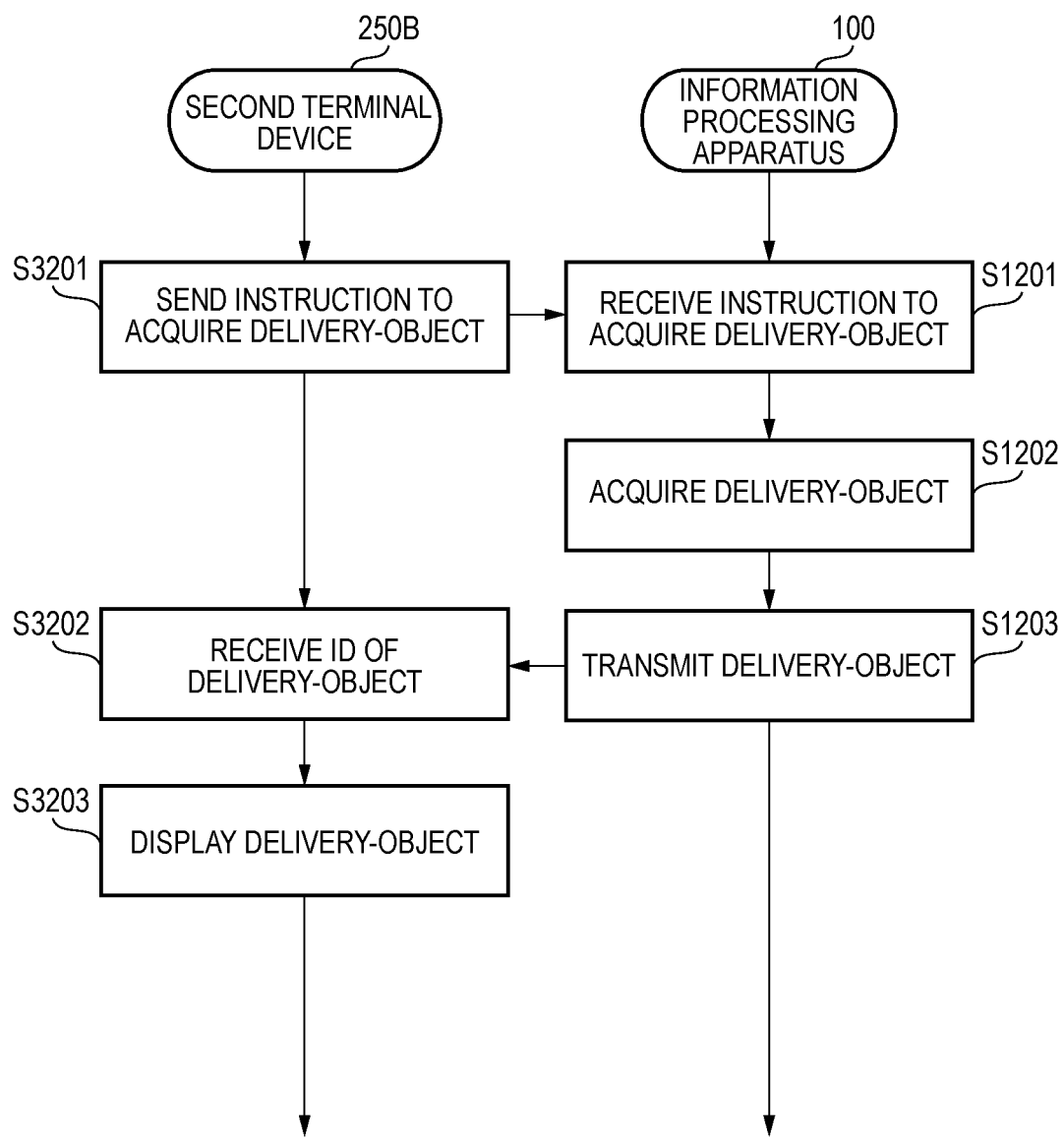
FIG. 7 is a sequence diagram of content display processing of a delivery-object.

Next, description will be made on an example of display processing of contents of a delivery-object performed by the second terminal device 250B and the information processing apparatus 100 and the contents of a delivery-object are displayed by the second terminal device 250B in detail based on the sequence diagram illustrated in FIG. 7. In an example of a sequence described below, it is regarded that the second terminal device 250B includes an access token t for which the scope allowing referring to the delivery-object is determined.

The second terminal device 250B accesses the URI used for referring to the delivery-object using the access token t and instructs the information processing apparatus 100 to acquire information of the delivery-object (S3201).

When an instruction to acquire information of a delivery-object is received from the second terminal device 250B (S1201), the information processing apparatus 100 verifies the access token t. In a case where the verification is successful, the information processing apparatus 100 acquires the information of the delivery-object (S1202). For example, in a case where a type attribute and an etag attribute is not set in the delivery-object, the information processing apparatus 100 acquires the information of the delivery-object after setting a type attribute and an etag attribute of the master data, which is the parent of the delivery-object, in the type attribute and the etag attribute of the delivery-object.

The information processing apparatus 100 transmits the acquired information (contents) of the delivery-object to the second terminal device 250B (S1203).

The second terminal device 250B receives the information of the delivery-object from the information processing apparatus 100 (S3202) and displays information of the delivery-object based on the received information of the delivery-object (S3203).

The description that has been made so far is an example of the display processing of the delivery-object.

3.3. Invalidation Processing of Delivery-Object 1

Next, description will be made on an example of invalidation processing of a delivery-object performed by the first terminal device 250A and the information processing apparatus 100 in detail based on the sequence diagram illustrated in FIG. 8. The example of a sequence described below corresponds to an example in which an owner of the master data (content owner) gives an invalidation attribute to the delivery-object so as to invalidate the delivery-object.

Figure 8:
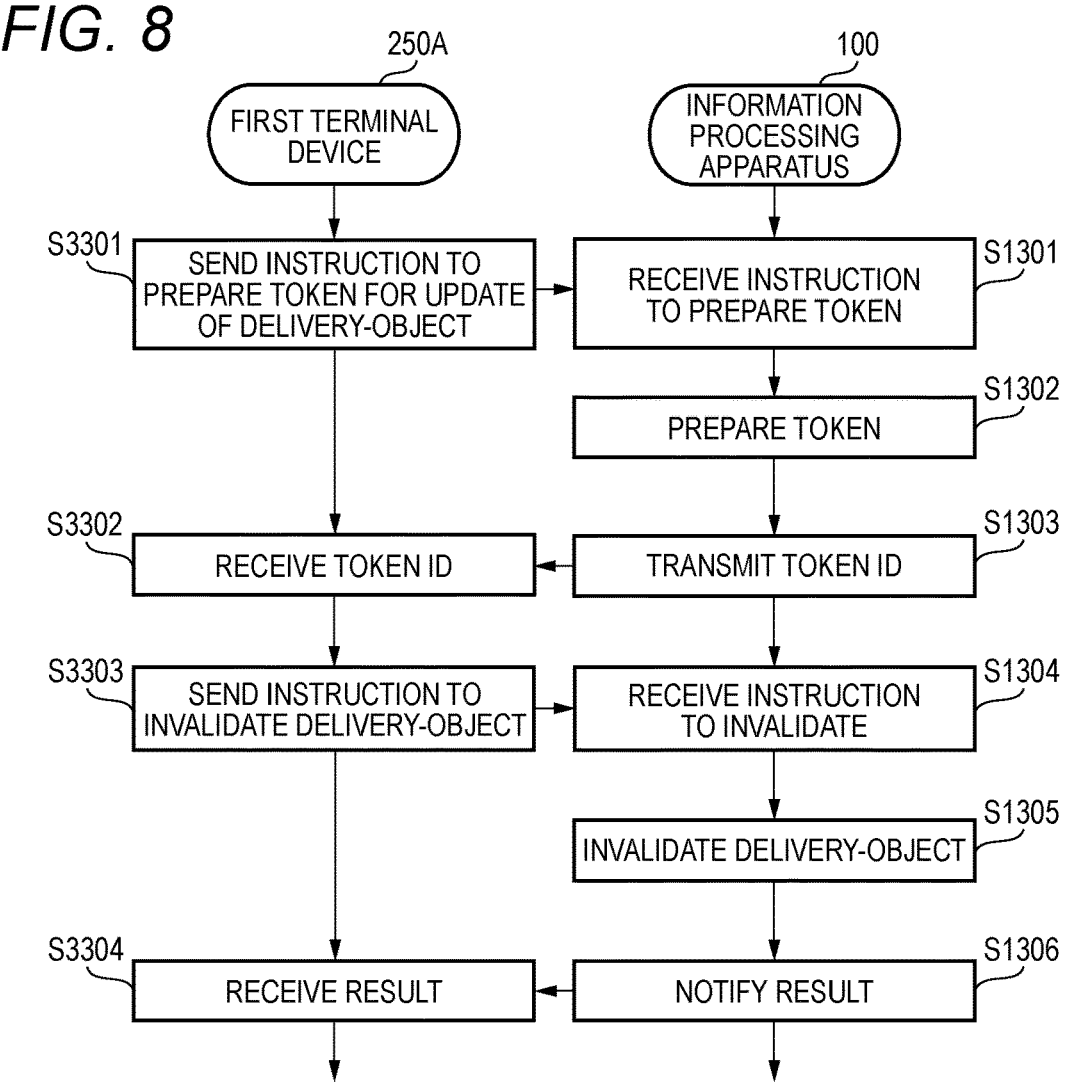
FIG. 8 is a sequence diagram of invalidation processing of the delivery-object.

As illustrated in FIG. 8, the first terminal device 250A transmits an instruction to prepare an access token T3 (child Content Token) for updating the attribute of the delivery-object to the information processing apparatus 100, using the access token T2 (S3301).

When the instruction to prepare the access token T3 is received (S1301), the information processing apparatus 100 verifies the access token T3. In a case where the verification is successful, the information processing apparatus 100 prepares the access token T2 (S1302). The information processing apparatus 100 transmits an ID of the prepared access token T3 to the first terminal device 250A (S1303).

When the ID of the access token T3 is received from the information processing apparatus 100 (S3302), the first terminal device 250A transmits an instruction to give an invalidation attribute to the delivery-object to the information processing apparatus 100 using the access token T3 (S3303).

When the instruction to give an invalidation attribute to the delivery-object is received (S1304), the information processing apparatus 100 verifies the access token T3. In a case where the verification is successful, the information processing apparatus 100 gives the invalidation attribute to the delivery-object (S1305). For example, the information processing apparatus 100 may update information of a validation flag of the delivery-object with F to thereby perform the invalidation processing.

The information processing apparatus 100 transmits the result of the invalidation processing to the first terminal device 250A (S1306).

The first terminal device 250A receives the result of the invalidation processing from the information processing apparatus 100 (S3304). The description that has been made so far is a first example of the invalidation processing of the delivery-object.

In the above description, in a case where the delivery-object is intended to be revalidated, the invalidation attribute of the delivery-object may be deleted (that is, information of validation flag may be updated with T).

3.4. Invalidation Processing of Delivery-Object 2

Figure 9:
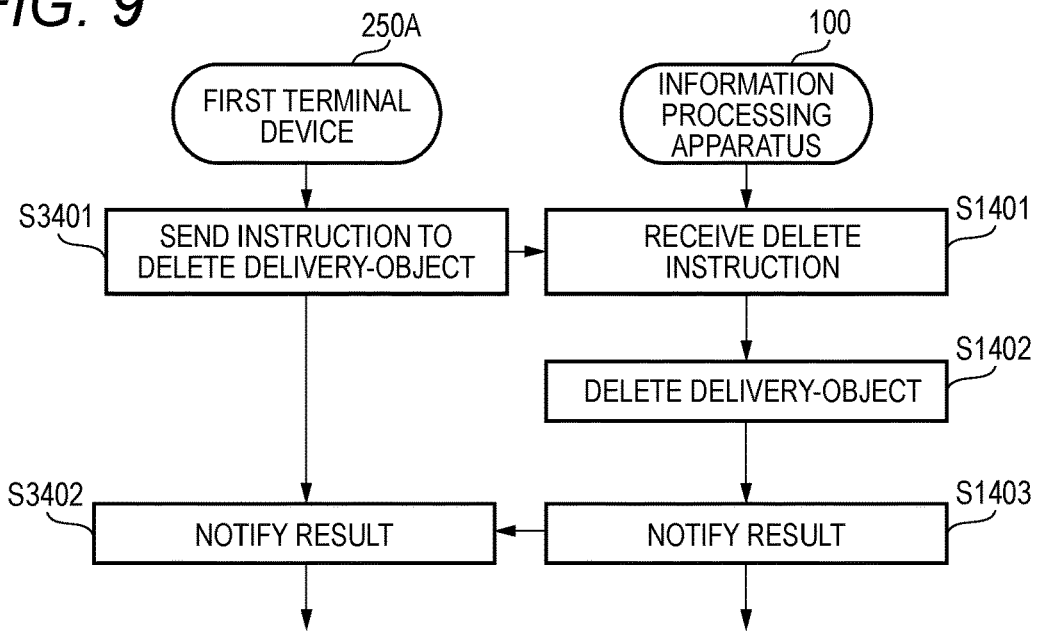
FIG. 9 is a sequence diagram of invalidation processing of the delivery-object.

Next, description will be made on a second example of invalidation processing of a delivery-object performed by the first terminal device 250A and the information processing apparatus 100 in detail based on the sequence diagram illustrated in FIG. 9. In the example of a sequence described below, the invalidation processing of a delivery-object is performed by deleting the delivery-object.

The first terminal device 250A transmits a deletion instruction of a delivery-object to the information processing apparatus 100, using the access token T2 (S3401).

When the deletion instruction of the delivery-object is received (S1401), the information processing apparatus 100 verifies the access token T2. In a case where the verification is successful, the information processing apparatus 100 deletes the delivery-object (S1402). The information processing apparatus 100 transmits the result of the deletion processing to the first terminal device 250A (S1403).

The first terminal device 250A receives the result of the deletion processing from the information processing apparatus 100 (S3402). The description that has been described so far is a second example of the invalidation processing of the delivery-object.

3.5. Freezing Processing of Delivery-Object

Figure 10:
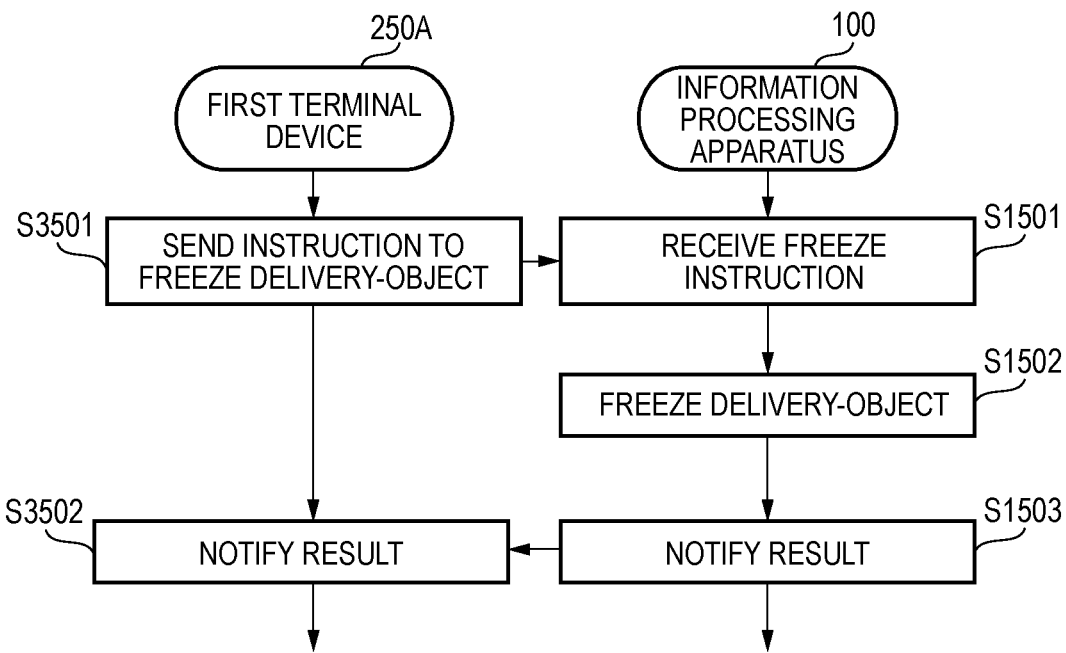
FIG. 10 is a sequence diagram of freezing processing of the delivery-object.
Figure 11:
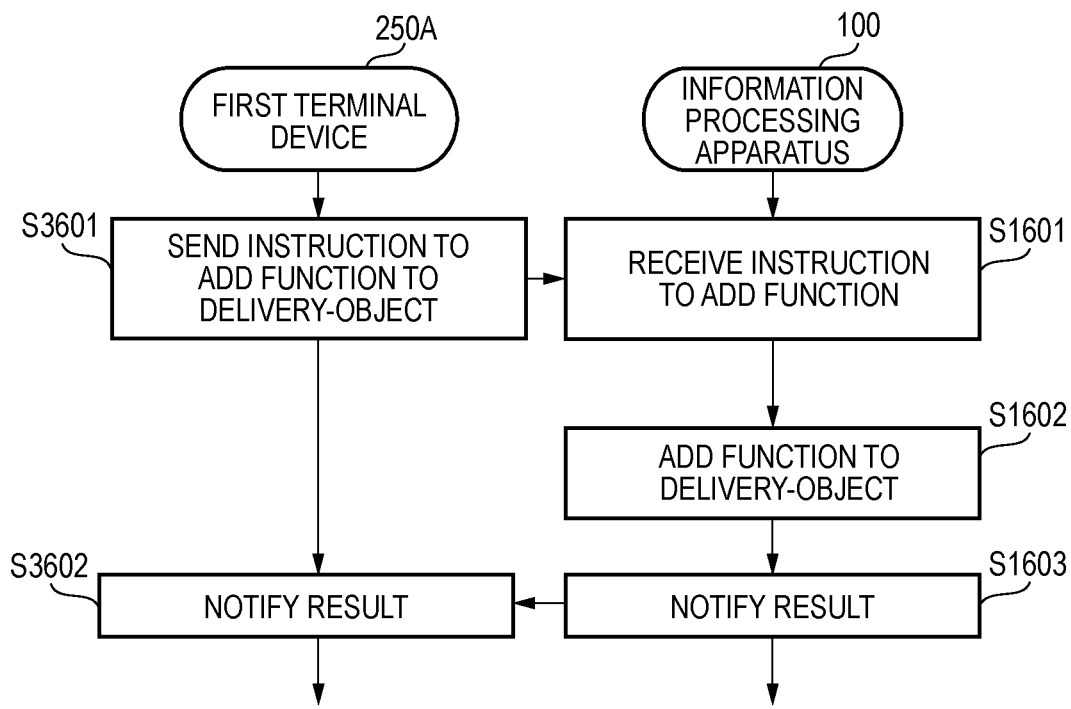
FIG. 11 is a sequence diagram of addition processing of an arbitrary function to the delivery-object.
Figure 12:
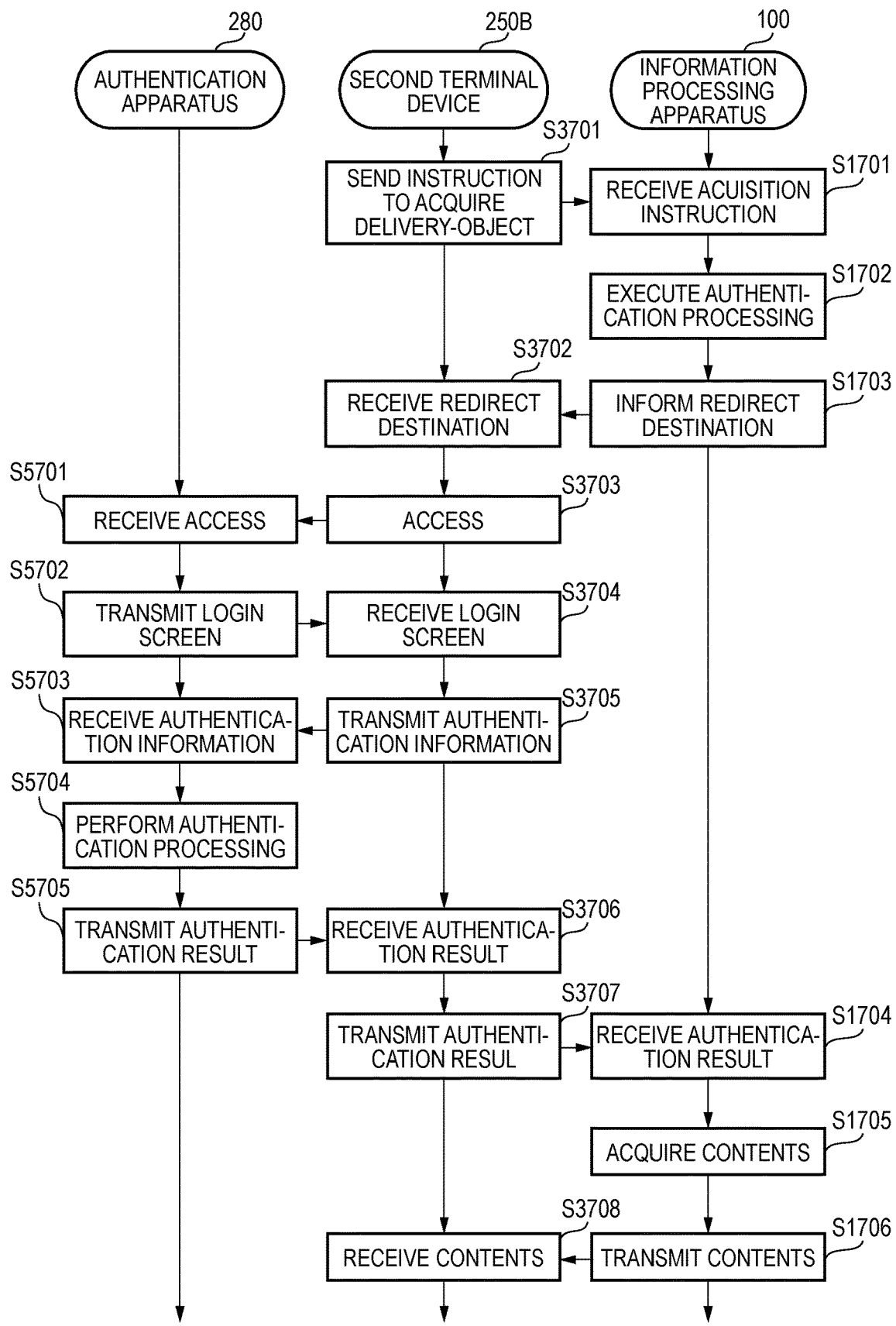
FIG. 12 is a sequence diagram of content display processing of a delivery-object to which authentication is added.

Next, description will be made on an example of freezing processing of a delivery-object performed by the first terminal device 250A and the information processing apparatus 100 in detail based on the sequence diagram illustrated in FIG. 10. The freezing processing means that continuous referring to the master data of the delivery-object is ended at a predetermined time point (for example, ending time point of work consignment) and information of the delivery-object is fixed at the time point.

The first terminal device 250A transmits a freezing instruction of a delivery-object to the information processing apparatus 100, using the access token T3 (S3501).

When the freezing instruction of the delivery-object is received (S1501), the information processing apparatus 100 verifies the access token T3. In a case where the verification is successful, the information processing apparatus 100 freezes the delivery-object (S1502). For example, the information processing apparatus 100 sets an etag attribute of the master data at the time point of receiving the freezing instruction to the etag attribute of the delivery-object. With this, even if the master data is updated after the setting of the etag attribute of the delivery-object, the content of the delivery-object are fixed to the content of the master data at the time point of receiving the freezing instruction. The type attribute of the delivery-object may not be updated.

The information processing apparatus 100 transmits the result of the freezing processing to the first terminal device 250A (S1503).

The first terminal device 250A receives the result of the freezing processing from the information processing apparatus 100 (S3502). The description that has been described so far is an example of the freezing processing of the delivery-object.

In the above description, in a case where freezing of the delivery-object is intended to be released, a value of the etag attribute of the delivery-object may be deleted. With this, referring to the master data, which is a parent object of the delivery-object, may be recovered.

3.6. Addition Processing of Arbitrary Function (for Example, Authentication) to a Delivery-Object Next, description will be made on an example of addition processing of arbitrary function to a delivery-object performed by the first terminal device 250A and the information processing apparatus 100 in detail based on the sequence diagram illustrated in FIG. 11. In the example of a sequence described below, a function for performing authentication processing is added in an authentication apparatus at the time of accessing the delivery-object.

The first terminal device 250A transmits an addition instruction of a function to the delivery-object to the information processing apparatus 1000 using the access token T3 (S3601).

When the addition instruction of the function to the delivery-object is received (S1601), the information processing apparatus 100 verifies the access token T3. In a case where the verification is successful, the information processing apparatus 100 adds a designated function to the delivery-object (S1602). For example, the designated function is adapted to return a true or a false as to whether the access token is authenticated or not in an authentication apparatus.

The information processing apparatus 100 transmits the result of the addition processing to the first terminal device 250A (S1603).

The first terminal device 250A receives the result of the addition processing from the information processing apparatus 100 (S3602). The description that has been described so far is an example of the addition processing of the function to the delivery-object.

The function added to the delivery-object is not limited to the authentication processing. For example, a function, which notifies the owner of the content that referring to the delivery-object is performed in a case where the delivery-object is referred to, may be added to the delivery-object.

3.7. Content Display Processing of a Delivery-Object to which Authentication is Added Next, description will be made on an example of processing performed when the second terminal device 250B displays the delivery-object to which authentication is added based on the sequence diagram illustrated in FIG. 12. The example of a sequence described below corresponds to a case where authentication by the authentication apparatus 280 is not ended.

The second terminal device 250B accesses the URI used for referring to the content of the delivery-object using the access token t and instructs the information processing apparatus 100 to acquire information of the delivery-object (S3701).

When an instruction to acquire information of a delivery-object is received from the second terminal device 250B (S1701), the information processing apparatus 100 verifies the access token t. In a case where the verification is successful, the information processing apparatus 100 executes the function of the added authentication (S1702). The information processing apparatus 100 informs the second terminal device 250B that an authentication apparatus 280 which is an authentication destination is a redirect destination (S1703).

When the redirect destination is received from the information processing apparatus 100 (S3702), the second terminal device 250B accesses the authentication apparatus 280 which is the redirect destination (S3703).

When the access from the second terminal device 250B is received (S5701), the authentication apparatus 280 transmits a login screen to the second terminal device 250B (S5702).

When the login screen is received from the authentication apparatus 280 (S3704), the second terminal device 250B displays the received login screen and receives an input of authentication information from a user. When the input of authentication information is received, the second terminal device 250B transmits the received authentication information to the authentication apparatus 280 (S3705).

When the authentication information is received from the second terminal device 250B (S5703), the authentication apparatus 280 performs the authentication processing based on the received authentication information (S5704). The authentication apparatus 280 transmits the result of the authentication processing (success/failure of authentication) to the second terminal device 250B (S5705).

The second terminal device 250B receives the result of the authentication processing from the authentication apparatus 280 (S3706) and transmits the received result of the authentication processing to the information processing apparatus 100 (S3707).

The information processing apparatus 100 receives the result of the authentication processing from the second terminal device 250B (S1704). In a case where the received result of the authentication processing is successful, the information processing apparatus 100 acquires information (contents) of the delivery-object (S1705).

The information processing apparatus 100 transmits the acquired information (contents) of the delivery-object to the second terminal device 250B (S1706).

The second terminal device 250B receives the information of the delivery-object from the information processing apparatus 100 (S3708) and displays the received information of the delivery-object based on the received delivery-object.

The description that has been described so far is an example of the display processing of the delivery-object to which authentication processing is added.

In a case where the second terminal device 250B is already authenticated in the authentication apparatus 280, the second terminal device 250B may not perform processing of S3703 to S3706 and perform processing of S3707 after the processing of S3702.

4. Other Configuration Example of Object

The present invention is not limited to the exemplary embodiments described above. For example, the delivery-object may be configured as follows.

4.1. Configuration Example 1

Figure 13:
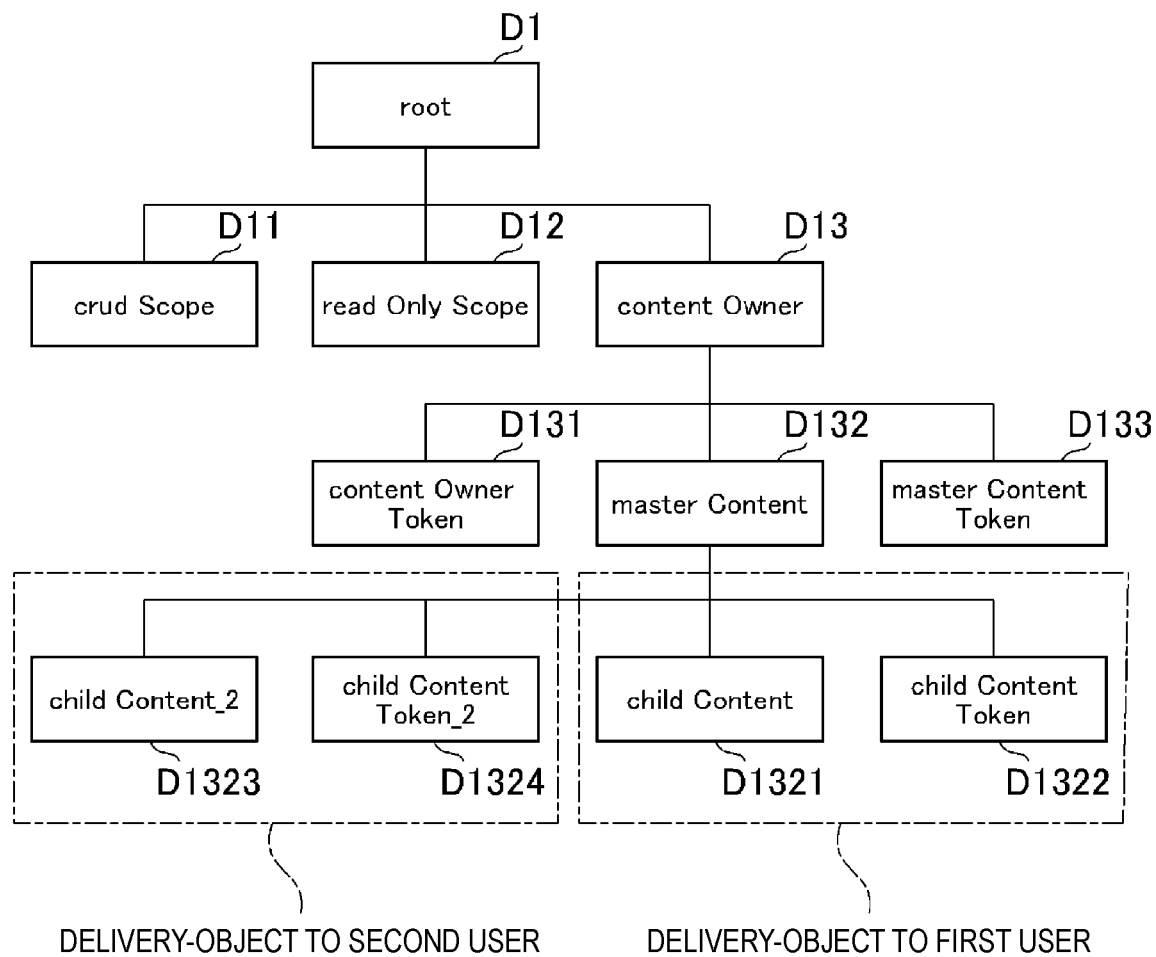
FIG. 13 is a diagram illustrating a configuration example of objects.

In FIG. 13, a configuration example of object in a case where a delivery-object is prepared for each delivery destination is illustrated. A tree structure of objects illustrated in FIG. 13 is different from that of FIG. 3 in that a "child Content_2" object D1323 which is a delivery-object to a second user and a "child Content Token_2" object D1324 which is for updating the "child Content_2" object are added, but as to the rest, other objects are common in the tree structure. Accordingly, the delivery-object is prepared for each delivery destination and thus, it becomes possible to provide information with customized contents to each delivery destination and perform execution of control with the information for each delivery destination.

4.2. Configuration Example 2

Figure 14:
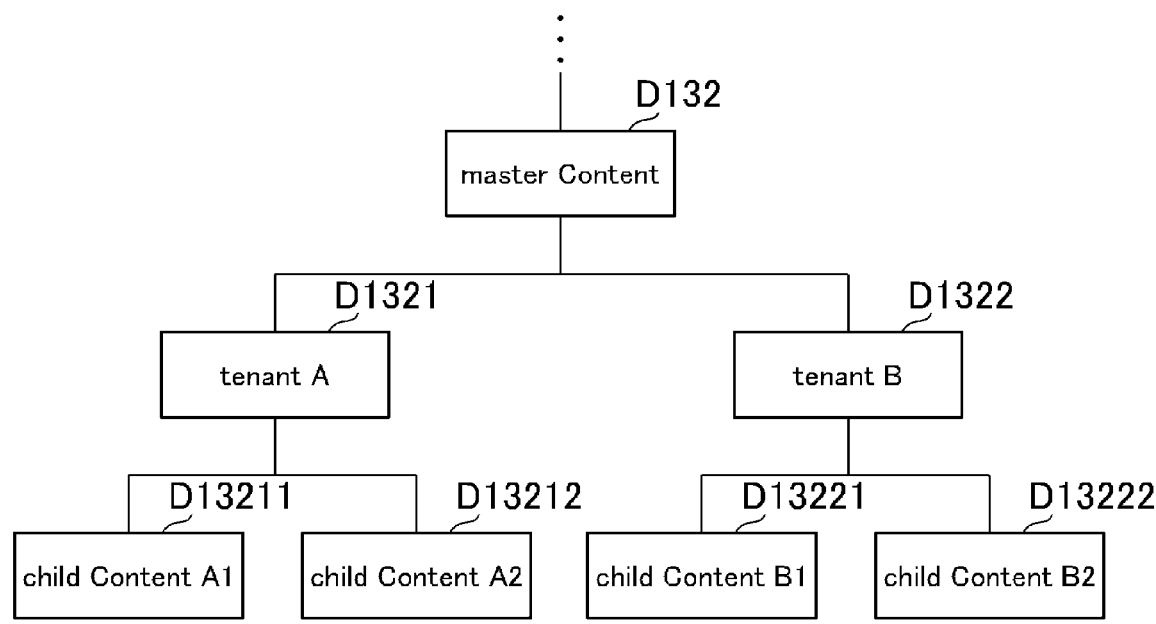
FIG. 14 is a diagram illustrating another configuration example of objects.

In FIG. 14, a configuration example of objects in a case where a child object of master data is prepared for each tenant (organization) to which a delivery destination belongs and the delivery destination is configured by the child object of the tenant is illustrated. A "tenant A" D1321 and a "tenant B" D1322 are child objects of a "master Content" D132, respectively. The "child Content A1" D13211 and the "child Content A2" D13212, that are the objects for delivery, are prepared for the delivery destinations A1 and A2, that belong to the "tenant A", respectively. Furthermore, a "child Content B1" D13221 and a "child Content B2" D13222, that are the objects for delivery, are prepared for the delivery destinations B1 and B2, that belong to the "tenant B", respectively.

The contents that are common in delivery destinations A1 and A2 (however, contents different from the delivery destinations B1 and B2) may be described in the "tenant A" D1321. The contents different between the delivery destinations A1 and A2 may be described in the "child Content A1" D13211 and the "child Content A2" D13212, respectively. This is also similarly applied to the delivery destinations B1 and B2.

4.3. Configuration Example 3

Figure 15:
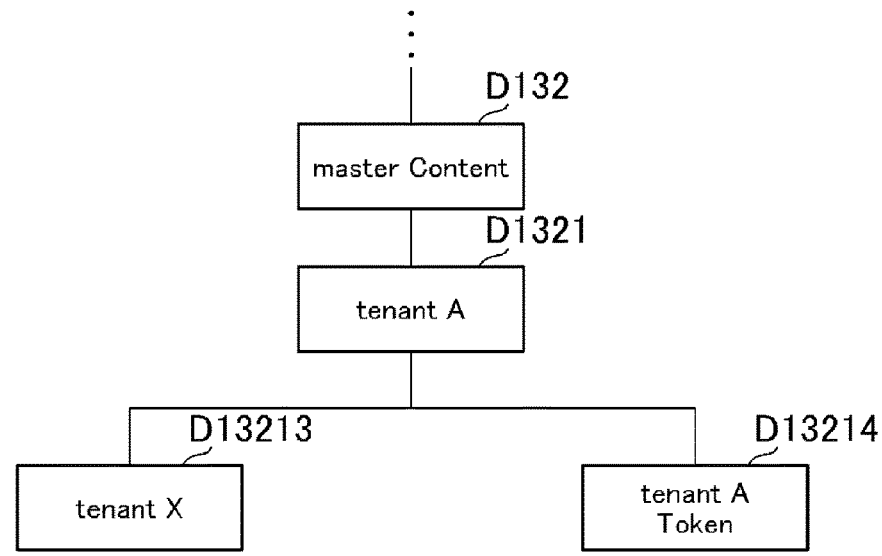
FIG. 15 is a diagram illustrating still another configuration example of objects.

In FIG. 15, a configuration example of object corresponding to a case where a tenant to which the delivery destination belongs is hierarchically structured with further number of layers. As illustrated in FIG. 15, "a "tenant X" D13213 and a "tenant A Token" D13214 are prepared as child objects of the "tenant A" D1321. The "tenant A Token" D13214 is regarded as an access token of which an owner is set as the "tenant A", a client is set as the "tenant X", and a scope is set as the CRUD. With this, the tenant A is able to prepare a descendent of the object placed at a lower layer than the "tenant A" in the hierarchy structure.

The description that has been described so far is illustrative of a configuration of the objects, it is easy to make the configuration of the objects to correspond to an organization of targets to which the contents are to be delivered, and in such case, it is easy to perform preparation of details of the contents, execution of a control of the contents, or the like.

The exemplary embodiments described above are described as specific examples and the invention disclosed in the present specification is not limited to configurations or examples of data storing of the specific example. An ordinary skilled person in the art may make various modifications, for example, change to a data structure or an execution sequence of processing to the disclosed exemplary embodiments. It is to be understood that a technical scope of the invention disclosed in the present specification include the modifications made to the disclosed exemplary embodiments.

5. Example of Distributed Resource Management

As described above using the example of FIG. 2, an example of a case where the third terminal device 250C and the fourth terminal device 250D that include the information processing apparatus 100 uses the information processing apparatus 100A at a remote operation and a case where the third terminal device 250C and the fourth terminal device 250D use the information processing apparatus 100C and the local information processing apparatus 100D of a local side, respectively, will be described. In particular, description will be made in such a way that for a memory, the information processing apparatus 100A is set as the remote operation and the data storage module 110 is set as the local operation.

The object management module 140 manages information of objects of which at least one of a parent or a child is determined by the information processing apparatus 100.

The object management module 140 manages the information of objects of which at least one of the parent or the child is determined by the information processing apparatus 100A which is accessible from plural terminal devices 250.

The request reception module 120 receives a request which includes a designation of an authority object which is an object associated with authority information and is for a target object to be managed by the data storage module 110 or the information processing apparatus 100A.

The request processing module 150 performs processing corresponding to the request on the information of the target object based on a comparison result in an authority between an owner object which is an object for which the authority information is authorized and an object which is the parent of the authority object.

In a case where the request corresponds to processing of creation, updating, or discarding of the information of the object, the request processing module 150 performs the processing of creation, update, or discarding using the data storage module 110. In a case where the request corresponds to processing of reflection of the information which is created, updated, or discarded into the data storage module 110 into the information processing apparatus 100A, the request processing module 150 performs the processing of reflection on the data storage module 110 in the information processing apparatus 100A.

In a case where the request is a request for prohibition of alteration of information of an object, the request processing module 150 may also prohibit alteration of information of a descendent object of the object.

The request processing module 150 may prohibit alteration of information of a corresponding object in the data storage module 110 before writing of the information of the object into the information processing apparatus 100A is started and release the prohibition of alteration when the writing is finished.

The processing result provision module 160 may store a user who performs a request for the information of the object in the information processing apparatus 100A and may notify the user that the information of the object is altered in a case where the alteration of the information of the object is performed.

A case where the first terminal device 250A uses the information processing apparatus 100A at a remote operation is based on the premise that a prototype-based object space is an execution environment capable of hosting the apparatuses. Accordingly, restrictions in a memory space or restrictions that a process is unable to be persistently activated (a heap becomes lost when the processing is ended) does not become problematic.

However, in a case where a large scale data aggregation infrastructure is actually constructed, the following three points becomes problematic. Basically, although it may be said that "a key value store (KVS) of a remote side is in synchronization with a local KVS", targets to be synchronized are not clear as in Git, which is a distributed version control system. In Git, all objects included in a repository should be synchronized, but, in the system according to the present exemplary embodiment, a part of whole object space of a remote side should be synchronized and there is no obvious perimeter such as a repository in Git. (1) The interface is a request/response for a service and is not able to be used unless the service is not activated. Loads are concentrates on the service. The resource management function is not necessarily completed only by the object and data in a range required for processing and an execution of handling of all the objects and data and a token verification by a single remote service is not always necessary.

For example, basic KVS functions are provided as services in most of cloud based applications and availability of these services are not responsibility of a user. When accessing (that is, a CRUD such as put, get) by the KVS function is able to be compatible with topological privilege control by a prototype inheritance without inconsistency, it is possible to actually enjoy benefits from the related art without bearing the control responsibility for operation and maintenance of the service. Scalability is also automatically increased. (2) A maintenance unit of the object and data and the CRUD interface are referred to as a repository. The repository is at a remote place and thus, latency is not negligible depending on a use case. For example, when information of 50000 devices is represented as objects, in a case where these objects are either assigned new attribute information (for example, a score evaluation value by an evaluation function) or updated, or in a case where processing such as an acquisition, processing, or a change of object per a single object is performed 20 times, when the number of processing times is converted into the number of times in which put/get for an object is performed, it amounts to 1000000 access times. The total processing time for the object becomes 1000 seconds even for the object having the latency which is in an order of 1 msec. (3) Non-lookup processing such as a scan operation is not performed. For example, an identifier of an object identifier in the related art is credential information in some cases and thus, non-permission of the look up is logically necessary, and on the other hand, a forcible application of the restriction on an object occupied by a user of himself/herself (the object is owned by a user of himself/herself and thus is not information unable to known to the user) is not pay from the viewpoint of convenience and performance. Abandonment of the object due to loss of the identifier or overhead for referring to in a case where a collection of objects are nested as an object, or the like is an example of the matters that do not pay from the viewpoint of convenience and performance described above.

In the exemplary embodiment, the repository is configured in a distribution manner as a KVS in a form which is not inconsistent with the topological privilege control due to the prototype inheritance and a mechanism which is capable of effectively performing synchronization of states is introduced. Specifically, the acquisition of the object is transparently performed from a remote side, the creation, the update, or the deletion having side effects is performed at the local side, and a series of results to which side effects are given are collectively reflected from the local side to the remote side (push). Also, the series of results are reflected from the remote side to the local side (pull).

In a use case for data aggregation, it is efficient, by a service (data source) having a large data set, to process data in the local side and then push the data into the remote side of a master side. A user needs to take into data updated by other owner in by a pull operation from a standpoint of the client who uses data.

The information processing apparatus 100A maintains an object of a remote side. Specifically, the information processing apparatus 100A maintains the object as a KVS (identifier is not able to be estimated at random and also not accidentally matched). Here, an API that lists up all maintained keys is not provided. The information processing apparatus 100A maintains persistent storage and has a lifetime exceeding a period spanning from a start-up to an end of an execution which will be described.

The information processing apparatus 100A maintains data of a remote side. Specifically, the information processing apparatus 100A maintains data as the KVS. An identifier may be set as a hash value of the data itself. Here, an API that lists up all maintained keys is not provided. The maintaining unit maintains persistent storage and has a lifetime exceeding a period spanning from a start-up to an end of an execution which will be described.

The authority object verification module 130 verifies the token included in the request. When the verification result is successful, the authority object verification module 130 takes out the scope. It is necessary that the token is the identifier of the object which is included in the information processing apparatus 100A and is not invalidated and the prototype of the object which indicates the token is included in a prototype chain of the owner who claims the token.

The data storage module 110 maintains the object of a local side. Specifically, the data storage module 110 maintains the object as the KVS. The identifier is not able to be estimated at random and is not accidentally matched. Here, an API that lists up all maintained keys and is not limited to the lookup may be used.

The data storage module 110 maintains the object of the local side. Specifically, the data storage module 110 maintains the object as a KVS. The identifier may be set as a hash value of the data itself. Here, an API that lists up all maintained keys and is not limited to the lookup may be used.

The object management module 140 maintains a list of altered objects. The object management module 140 maintains the object (an object of which alteration is not yet reflected to the information processing apparatus 100A) that is maintained in the data storage module 110 in a state of being created, updated, or deleted.

The request processing module 150 performs the processing corresponding to the request. A prototype-inherited object is loaded and a program is executed. Specifically, the program is executed in an execution environment provided with a memory (Java Script (registered trademark) or the like). The request processing module 150 may be connected to any of the information processing apparatus 100A and the data storage module 110.

When an object designated by the identifier is already loaded onto the request processing module 150, the object management module 140 returns the object. When the object is not present in the request processing module 150, the object management module 140 acquires an object from the data storage module 110 and loads the object onto the request processing module 150. In a case where the object is not present in the data storage module 110, the object management module 140 acquires an object from the information processing apparatus 100A, loads the object onto the request processing module 150, and also stores the object in the data storage module 110. The processing described above is recursively performed also on a prototype of the object to thereby load a prototype chain of the designated object in the request processing module 150 at the time of acquisition of the object. Also, the prototype chain becomes able to be loaded from the data storage module 110 for the same object even when the request processing module 150 is restarted.

The object management module 140 performs update of the object. The object management module 140 writes-back the loaded object (for which alteration after being loaded is permitted) into the data storage module 110 (or, in a case of an object which is newly generated from the request processing module 150, adds the object) and records the object which is written-back or added to the list of altered objects.

The object management module 140 performs push operation of altered objects. The object management module 140 collectively reflects a state of a cluster of the objects recorded in the list of the altered objects into the information processing apparatus 100A from the data storage module 110.

An authority determination is not needed for alteration of the object of a local side of the data storage module 110, and on the other hand, processing, which deviates from the authority claimed by the token which is transmitted with being accompanied fails, for alteration of the object of a remote side of the information processing apparatus 100A.

Alteration of the object of a remote side of the information processing apparatus 100A is performed by receiving the request and executing a scope of the attached token without directly operating the KVS. The alteration of the object may be performed through the request processing module 150 within the information processing apparatus 100A. In such a case, the processing, which deviates from the authority claimed by the token naturally fails.

In the following, an example as an API is described. (1) persistent processing (performs accessing to KVS)
 put(k, v), get(k), del(k)
 bind(buf), resolve(etag), unbind (etag)(2) execution processing (there are two kinds of persistent processing of a remote persistent processing and a local persistent processing)
 rs.gen(proto)
This operation creates a child object obj of the proto and returns the object obj.

The object obj exists only in a memory without being persistent.
 rs.get (id)
This operation returns an object when the object is already loaded in an execution environment.

This operation loads a value of the object when the object is not loaded and is capable of being get from a local side. When the object does not exist in the local side and is capable of being get from a remote side, the value is cached in the local side and loaded onto the execution environment. The prototype of the loaded object is recursively subjected to the rs.get.
 rs.up (obj)
This operation performs put on the object obj under the execution environment in a persistent layer.

An obj.id is added to a list of altered objects.
 rs.down (id)

This operation recursively acquires the object from the persistent layer when an object having the id is loaded during the execution environment. The prototype is subjected to the rs.get when the prototype is replaced at a separate object.
 rs.bind (buf) and rs.resolve (etag)
This operation performs a wrapper of the bind and the resolve (sandwiching the loading and saving of the object onto the memory) of a persistent unit. Here, the wrapper includes data or functionality provided by a certain class, a function, a data type, or the like and is provided in a separate form.
 rs.push ( )
This operation reflects alteration of the object, which exists in the list of altered objects into a local side, into a remote side. An ID of the object for which the reflection into the remote side is successful is removed from the list.
 rs.pull ( )
This operation reflects alteration of the object, which exists in the list of altered objects (furthermore, a list for the local side) into a remote side, into a local side. An ID of the object for which the reflection into the local side is successful is removed from the list.

Description will be made on transaction processing.

In a case where a lock is applied (prohibition of alteration) to a portion of an object tree (in a remote side), a lock flag is given to a root of a node during the transaction to thereby lock descendents of the objects simultaneously.

When the transaction is completed, the lock flag of the root node is released and thus descendents of the root node are released simultaneously.

Specifically, in a case where the object management module 140 performs the push operation on the altered object, a lock is given to an owner object in the local side that corresponds to the altered object before a write into the remote side is started and release the lock when the write into the remote side is completed. In a case where the object is acquired, the object management module 140 does not perform the loading of the object and caching of the object into the data storage module 110 when the object acquired from the information processing apparatus 100A is locked.

Description Will be Made on Notification of Alteration.

A peer (that is, a peer corresponding to the terminal device 250 including the data storage module 110 which maintains the object and data of a local side) having a KVS of its own obtained by performing the CRUD on the object is stored for each object and in a case where an alteration is made for the object, the alteration is notified to the peer. Otherwise, the list of the altered objects is delivered to the peer according to a request from the peer.

Specifically, a peer which performs the CRUD operation on the object in a remote within the information processing apparatus 100A is added to a subscriber attribute (here, the peer is recorded in a list of subscribers), and when the CRUD operation (but, R (acquisition) operation is excluded) is performed on the object of a remote side within the information processing apparatus 100A, the peer of the subscriber list for a target object is notified that the target object is updated or the target object is added to a Mutate attribute (here, the list of the altered objects is recorded). Here, the subscriber is a user who performs a request for the CRUD operation.

Description Will be Made on Mapping to a File System.

A hierarchical structure of the file system is mapped to a prototype inheritance relationship of the objects and an identifier of a root is maintained in an '.owner'. With this, it is possible to intuitively manage and distribute the object similar to, for example, a repository managed by the Git.

Meta information or KVS is arranged in a '.rs' directory. For example, the directory is similar to a '.git' directory in the Git.

Description Will be Made on REST API of the File System.

The REST API of the related art is started at a remote side based on the mapping to the file system. With this, a local service is able to be started and to be used for a test or a limited contents distribution.

Description Will be Made in More Detail on the Transaction Processing.

In the related art (technique which does not use the exemplary embodiment), a lot of terminal devices access the processing apparatus of a remote side, the processing is concentrated. For that reason, the processing apparatus is bottle necked. Clustering or the like also causes complexity in installation or operation and as a result, when the processing apparatus becomes down, the service is not able to be provided. Only a lookup function is allowed for the KVS from security requirements.

The exemplary embodiment comes to the basis of the distributed resource, includes the execution environment (information processing apparatus 100C within third terminal device 250C) of its own and the KVS for each data source, and operates irrelevantly to the processing apparatus (the information processing apparatus 100A) of a remote side regarding the creation, update, and discarding. For example, availability of the KVS of a remote side may be guaranteed by a cloud service side.

In the KVS of a local side, only the object owned by the user or information acquired as a reference exists. For that reason, constraints from the security requirements are eliminated and an arbitrary API is available.

An apparatus which handles a large scale data source may be used as the third terminal device 250C.

The KVS of a remote side is accessed via a SDK as follows. aws=require ('aws-sdk')

The aws-sdk corresponds to the SDK of a Web Service or the like provided as a cloud Service.

The KVS of a local side is accessed via a SDK as follows. level DB=require ('level DB')

The level DB corresponds to a library or the like in a relational database management system.

Since it is KVS, it has the API such as the aws.put(key, value) or the level DB.get(key).

The APIs are KVS interfaces for a function of maintaining the object or data in the data storage module 110 and the information processing apparatus 100A.

In the object management module 140, the rs.get(id) which is an object acquisition function, the rs.up(obj) which is an object update function, the rs.push( ) which is an object alteration function, or the like may be implemented as the APIs which provide a resource based library loaded onto a local execution environment. A flowchart illustrating an operation example of the APIs will be described later.

The exemplary embodiment may be a program which runs on the execution environment of a local side and operates the KVS using the APIs.

Figure 16:
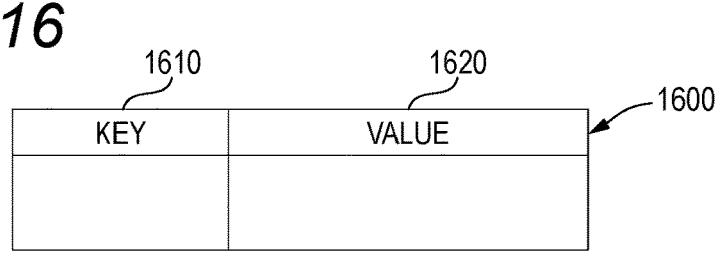
FIG. 16 is an explanatory diagram illustrating an example of a data structure of a KVS table.

A data structure of the KVS will be described using an example of a KVS table 1600. FIG. 16 is an explanatory diagram illustrating an example of a data structure of the KVS table 1600. The KVS table 1600 includes a key field 1610 and a value field 1620. A key is stored in the key field 1610. A value corresponding to the key is stored in the value field 1620.

By PUT processing, a key and a value is designated and the value corresponding to the key is able to be updated. By GET processing, the key is designated and the value corresponding to the key is able to be acquired.

An object store, a data store, and a list of altered objects are capable of being configured as the KVS table 1600.

The object store, for example, uses a 32-byte object identifier which is created in a random manner as the key and uses a Java Script object as the value.

The data store, for example, uses a byte array as the value and uses a SHA-256 value (32-byte) of the byte array as the key.

For example, records an identifier of the altered object is recorded in the list of altered objects. For example, here, the value may be an altered point of time (or date and time (year, month, day, hour, minute, second, smaller unit than a second, or a combination thereof)).

The object tree is the same as illustrated in the example of FIG. 3.

Figure 17:
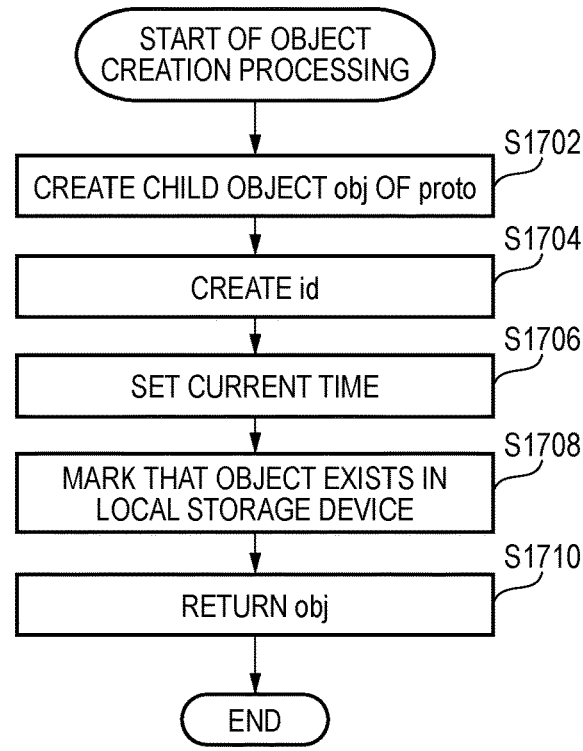
FIG. 17 is a flowchart illustrating an example of processing performed by the exemplary embodiment.

FIG. 17 is a flowchart illustrating an example of processing (object creation) performed by the exemplary embodiment. The example of the processing corresponds to the processing of the "rs.gen (proto)" described above. In the processing, a child object obj of the proto is created. The object created in the processing exists only in the memory and does not persistent until the rs.up (obj) is performed.

The object creation processing is started, and in Step S1702, the child object obj of the proto is created.

In Step S1704, an id is created. Specifically, in a case of a proto.id, the proto.id is set to an obj.proto. An identifier id created in a random manner is set to an obj.id.

In Step S1706, a point of current time is set. Specifically, the point of current time is set to an obj.createdAt.

In Step S1708, marking that the object of the object identifier id exists in a local storage device (memory) is made. For example, a cache object referred to as objs is prepared and objs [id]=obj is defined.

In Step S1710, the obj is returned.

Figure 18:
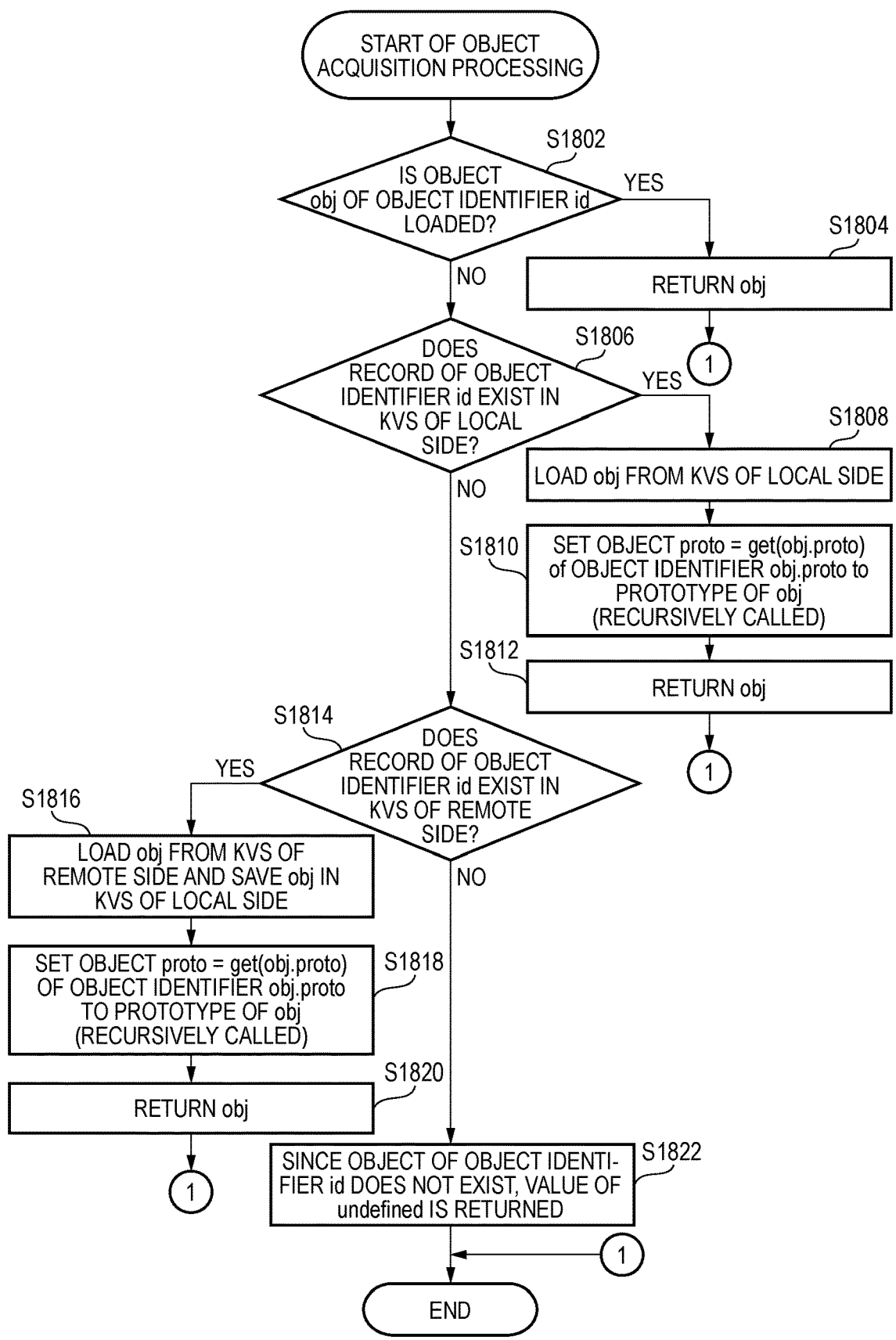
FIG. 18 is a flowchart illustrating another example of processing performed by the exemplary embodiment.

FIG. 18 is a flowchart illustrating another example of processing (object acquisition) performed by the exemplary embodiment. The example of the processing corresponds to the processing of the "rs.get (id)→obj" described above. The object identifier id is given to an argument and a corresponding obj is returned.

The object acquisition processing is started, and in Step S1802, it is determined whether the object obj of the object identifier id is loaded or not. In a case where the object obj is loaded, the processing proceeds to Step S1804 and otherwise, the processing proceeds to Step S1806.

In Step S1804, the obj is returned and the processing is ended.

In Step S1806, it is determined whether a record of the object identifier id exists in the local KVS or not. In a case where the record exists, the processing proceeds to Step S1808 and otherwise, the processing proceeds to Step S1814.

In Step S1808, the obj is loaded from the local KVS.

In Step S1810, the object proto=get(obj.proto) of the object identifier obj.proto is set to a prototype of the obj (recursively called).

In Step S1812, the obj is returned and the processing is ended.

In Step S1814, it is determined whether a record of the object identifier id exists in the remote KVS or not. In a case where the record exists, the processing proceeds to Step S1816 and otherwise, the processing proceeds to Step S1822.

In Step S1816, the obj is loaded from the KVS of a remote side and is saved in the local KVS.

In Step S1818, the object proto=get(obj.proto) of the object identifier obj.proto is set to a prototype of the obj (recursively called).

In Step S1820, the obj is returned and the processing is ended.

In Step S1822, since the object of the object identifier id does not exist, a value of an undefined is returned.

Figure 19:
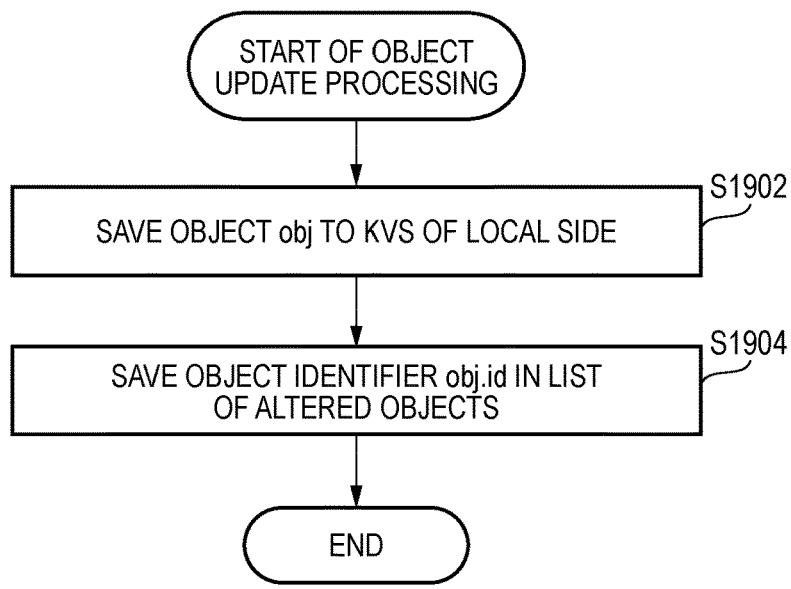
FIG. 19 is a flowchart illustrating still another example of processing performed by the exemplary embodiment.

FIG. 19 is a flowchart illustrating another example of processing (object update) performed by the exemplary embodiment. The example of the processing corresponds to the processing of the "rs.up (obj)" described above. The loaded object obj is saved in the KVS.

The object alteration update processing is started, and in Step S1902, the object obj is saved in the local KVS.

In Step S1904, the object identifier obj.id is saved in the list of altered objects.

Figure 20:
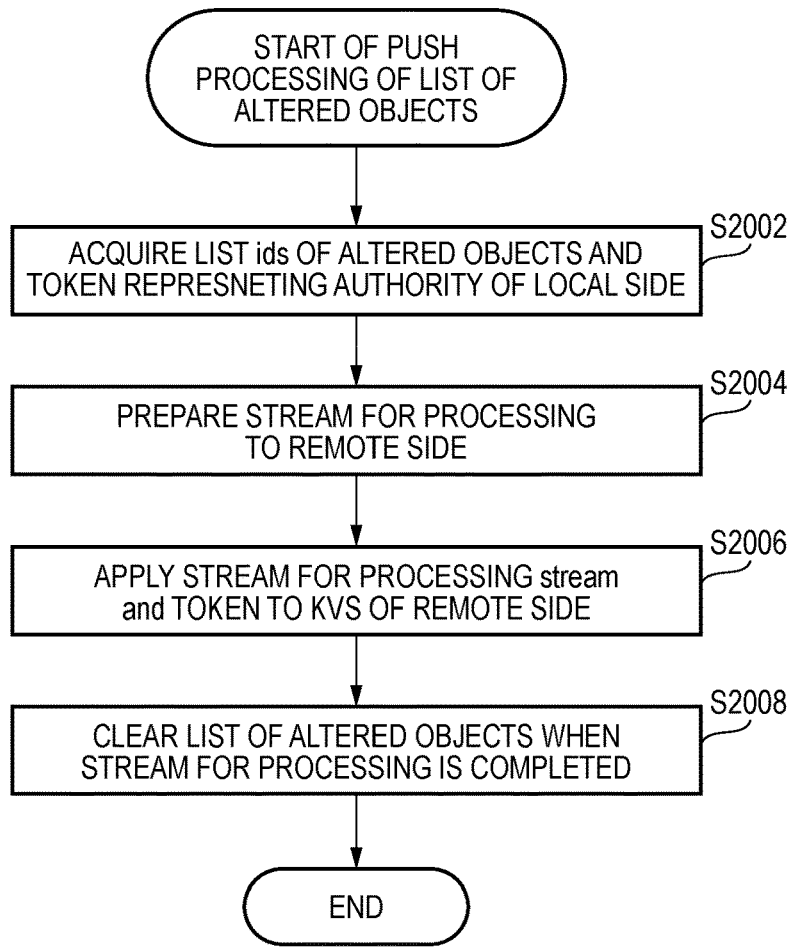
FIG. 20 is a flowchart illustrating still another example of processing performed by the exemplary embodiment.

FIG. 20 is a flowchart illustrating another example of processing (Push processing of the list of altered objects) performed by the exemplary embodiment. The example of the processing corresponds to the processing of the "rs.push ( )" described above. A cluster of objects, which exists in the KVS of a local side and of which alteration is not reflected into a remote side yet, is reflected into the KVS of a remote side.

The push processing of the list of altered objects is started, and in Step S2002, a token representing an authority of a local side and the list ids of altered objects are acquired.

In Step S2004, a stream for processing to a remote side is prepared.

In Step S2006, the stream for processing stream and the token are applied to the KVS of a remote side.

In Step S2008, when the stream for processing is completed, the list of altered objects is cleared.

Next, description will be made on the transaction processing. The example of the processing corresponds to processing related to a lock using the prototype inheritance.

A lock attribute is given to the object of a root (object stored in the information processing apparatus 100A) before the push of altered objects "rs.push ( )" is called and the lock attribution is removed after the call is made.

The object which is locked by the acquisition of the object is prevented from being cached in the KVS of a local side and is also prevented from being loaded.

When the service has a local repository, matters which are altered in the service are the objects owned by the service. Accordingly, when an attribute is given to the object representing the service itself, all the objects of the descendent of the service eventually have the lock attribute. In the description using the example of FIG. 3, when the object which becomes a service target is a "root" object D1, the is locked attribute is set to a "true" in all the objects of a "crud Scope" object D11, which is a descendent of the "root" object D1, or the like.

With this, it is possible to prevent that a third local execution environment (another terminal device 250 other than terminal device 250 which is editing the object) performs acquisition of an object during the transaction, loads an object being in an unfinished state (object under editing), or caches the object in the KVS of a local side.

Figure 21:
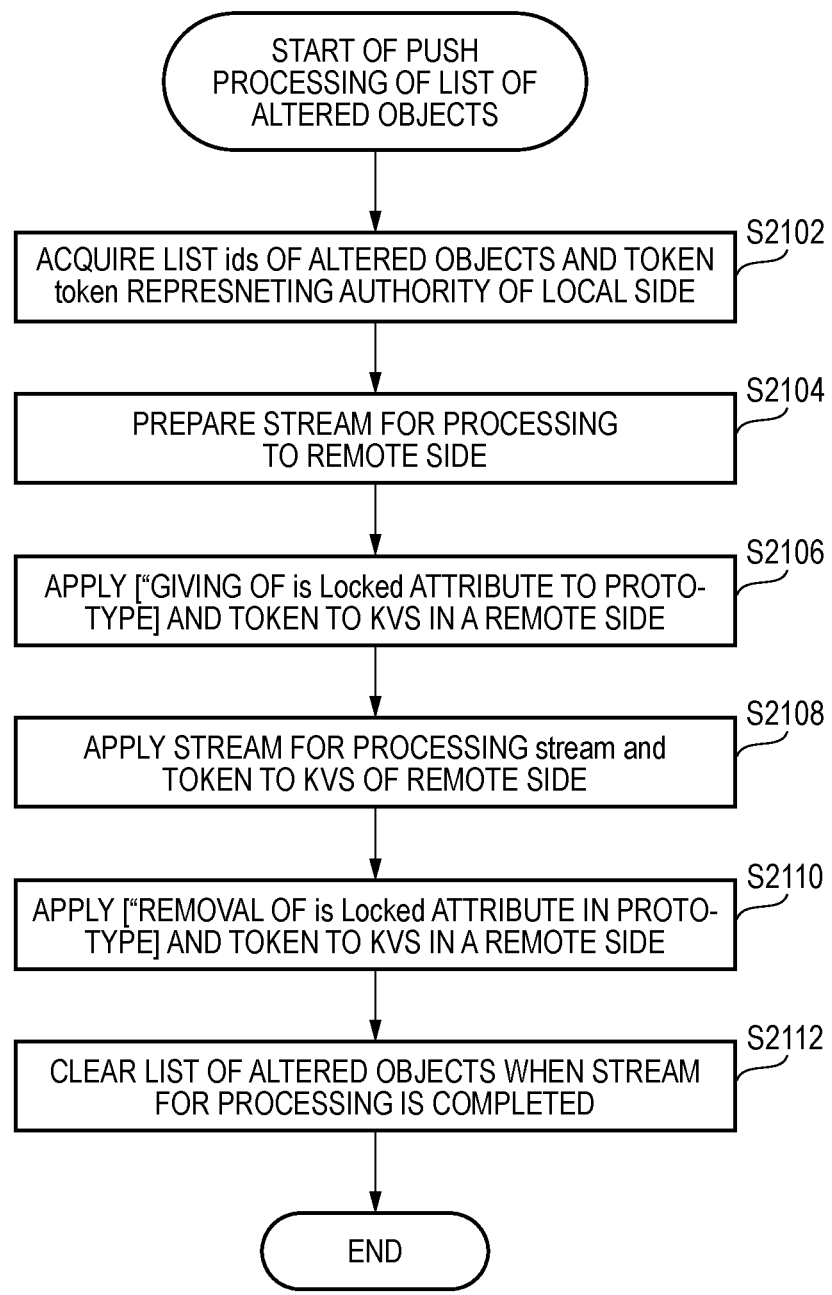
FIG. 21 is a flowchart illustrating still another example of processing performed by the exemplary embodiment.

FIG. 21 is a flowchart illustrating another example of processing performed by the exemplary embodiment. The example of the processing corresponds to the processing of the (Push processing of altered objects of list) "rs.push ( )" described above. A cluster of objects, which exists in the KVS of a local side and of which alteration is not reflected into a remote side, is reflected into the KVS of a remote side. The flowchart illustrated in the example of FIG. 21 is formed by adding processing of Step S2106 and processing of Step S2110 to the flowchart illustrated in the example of FIG. 20.

The push processing of the list of altered objects is started, and in Step S2102, a token representing an authority of a local side and the list ids of altered objects are acquired.

In Step S2104, a stream for processing to a remote side is prepared.

In Step S2106, the "giving of is locked attribute to prototype] and the token are applied to the KVS of a remote side.

In Step S2108, the stream for processing stream and the token are applied to the KVS of a remote side.

In Step S2110, the "removal of the is locked attribute in the prototype: and the token are applied to the KVS of a remote side.

In Step S2112, when the stream for processing is completed, the list of altered objects is cleared.

Figure 22:
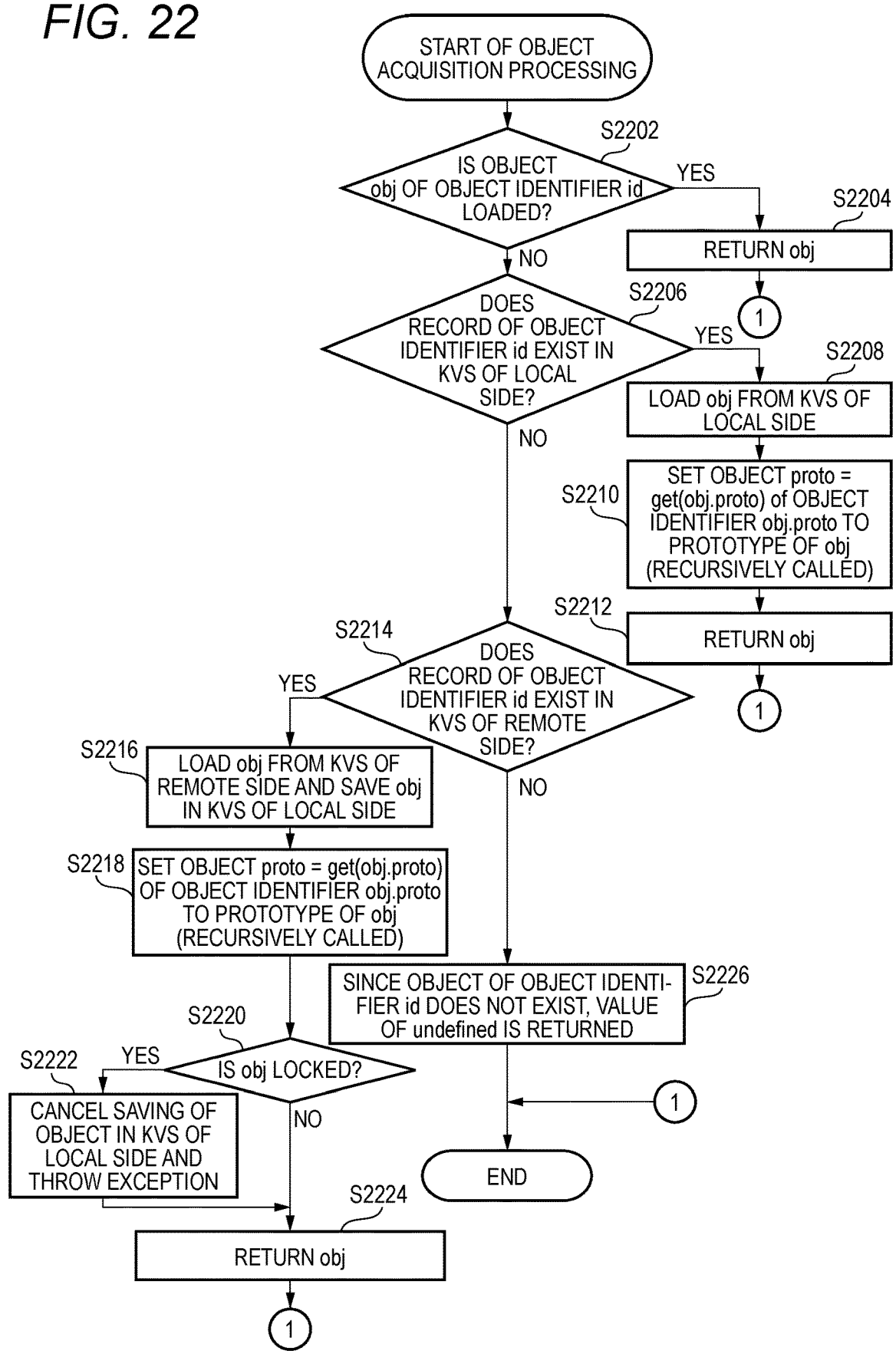
FIG. 22 is a flowchart illustrating still another example of processing performed by the exemplary embodiment.

FIG. 22 is a flowchart illustrating another example of processing (object acquisition) performed by the exemplary embodiment. The example of the processing corresponds to the processing of the "rs.get (id)→obj" described above. The object identifier id is given to an argument and a corresponding obj is returned. The flowchart illustrated in the example of FIG. 22 is formed by adding processing of Step S2220 and processing of Step S2222 to the flowchart illustrated in the example of FIG. 18. Accordingly, it is possible to prevent the locked object from being acquired from a remote side and thus, the processing illustrated in the example of FIG. 22 corresponds to alteration of the rs.get (id) described above.

The object acquisition processing is started, and in Step S2202, it is determined whether the object obj of the object identifier id is loaded or not. In a case where the object obj is loaded, the processing proceeds to Step S2204 and otherwise, the processing proceeds to Step S2206.

In Step S2204, the obj is returned and the processing is ended.

In Step S2206, it is determined whether a record of the object identifier id exists in the local KVS or not. In a case where the record exists, the processing proceeds to Step S2208 and otherwise, the processing proceeds to Step S2214.

In Step S2208, the obj is loaded from the local KVS.

In Step S2210, the object proto=get (obj.proto) of the object identifier obj.proto is set to a prototype of the obj (recursively called).

In Step S2212, the obj is returned and the processing is ended.

In Step S2214, it is determined whether a record of the object identifier id exists in the remote KVS or not. In a case where the record exists, the processing proceeds to Step S2216 and otherwise, the processing proceeds to Step S2226.

In Step S2216, the obj is loaded from the KVS of a remote side and is saved in the KVS of a local side.

In Step S2218, the object proto=get(obj.proto) of the object identifier obj.proto is set to a prototype of the obj (recursively called).

In Step S2220, it is determined whether the obj is locked or not. In a case where the obj is locked, the processing proceeds to Step S2222 and otherwise, the processing proceeds to Step S2224.

In Step S2222, saving of the object to the KVS of a local side is cancelled and an exception is thrown.

In Step S2224, the obj is returned and the processing is ended.

In Step S2226, since the object of the object identifier id does not exist, a value of an undefined is returned.

Next, description will be made on an alteration notification or pull processing will be described.

An entity having the local KVS accesses the KVS of a remote side and thereafter, the KVS of a remote side is altered such that a mismatch occurs between the KVS of a local side and the KVS of a remote side. That is, a situation that although information within the information processing apparatus 100A which is of a remote side is altered, information within the third terminal device 250C which is in a local side becomes an unaltered state occurs.

The exemplary embodiment makes it possible to deliver the alteration made in the remote side to the local side.

When the entity having the local KVS intends to access the KVS of a remote side, information about who (client) accesses the KVS of a remote side using what kind of an authority (owner) is needed.

Here, an "e" is set as an identifier of the KVS of a local side and an "r" is set as an identifier of an authority for accessing the KVS of a remote side.

In the KVS of a remote side, the subscriber attribute and the Mutate attribute are newly added and the attributes are updated accompanied by the CRUD operation in the KVS of a remote side.

The subscriber attribute and the Mutate attribute are optional attributes of the Object Store.

An entity to which the subscriber attribute is given and which performs the operation on the object is added to the object on which the entity having the KVS of a local side performs the operation.

An object to which the Mutate attribute is given and of which alteration is to be reflected is added to the subscriber object (entity added to the subscriber attribute).

Figure 23:
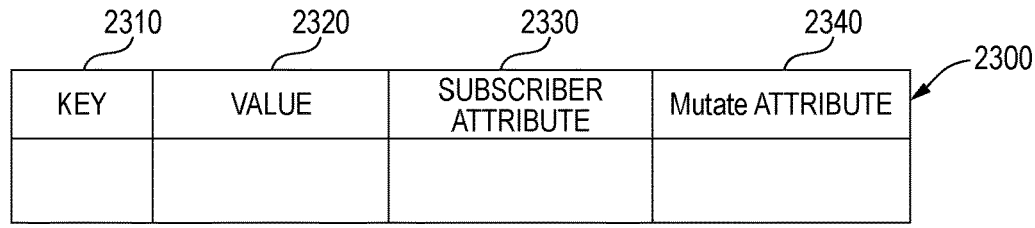
FIG. 23 is an explanatory diagram illustrating an example of a data structure of an object store KVS table.

For example, an object store KVS table 2300 is used as a KVS representing the attributes. FIG. 23 is an explanatory diagram illustrating an example of a data structure of the object store KVS table 2300. The object store KVS table 2300 is formed by adding a subscriber attribute field 2330 and a Mutate attribute field 2340 to the KVS table 1600 illustrated in the example of FIG. 16. The object store KVS table 2300 includes a key field 2310, a value field 2320, a subscriber attribute field 2330, and a Mutate attribute field 2340. A key is stored in the key field 2310. A value corresponding to the key is stored in the value field 2320. A subscriber attribute corresponding to the key is stored in the subscriber attribute field 2330. For example, there is a "list of the entities operating the object" as the subscriber attribute. A Mutate attribute corresponding to the key is stored in the Mutate attribute field 2340. For example, there is a "list of the altered objects to be reflected by the entity" as the Mutate attribute.

Figure 24:
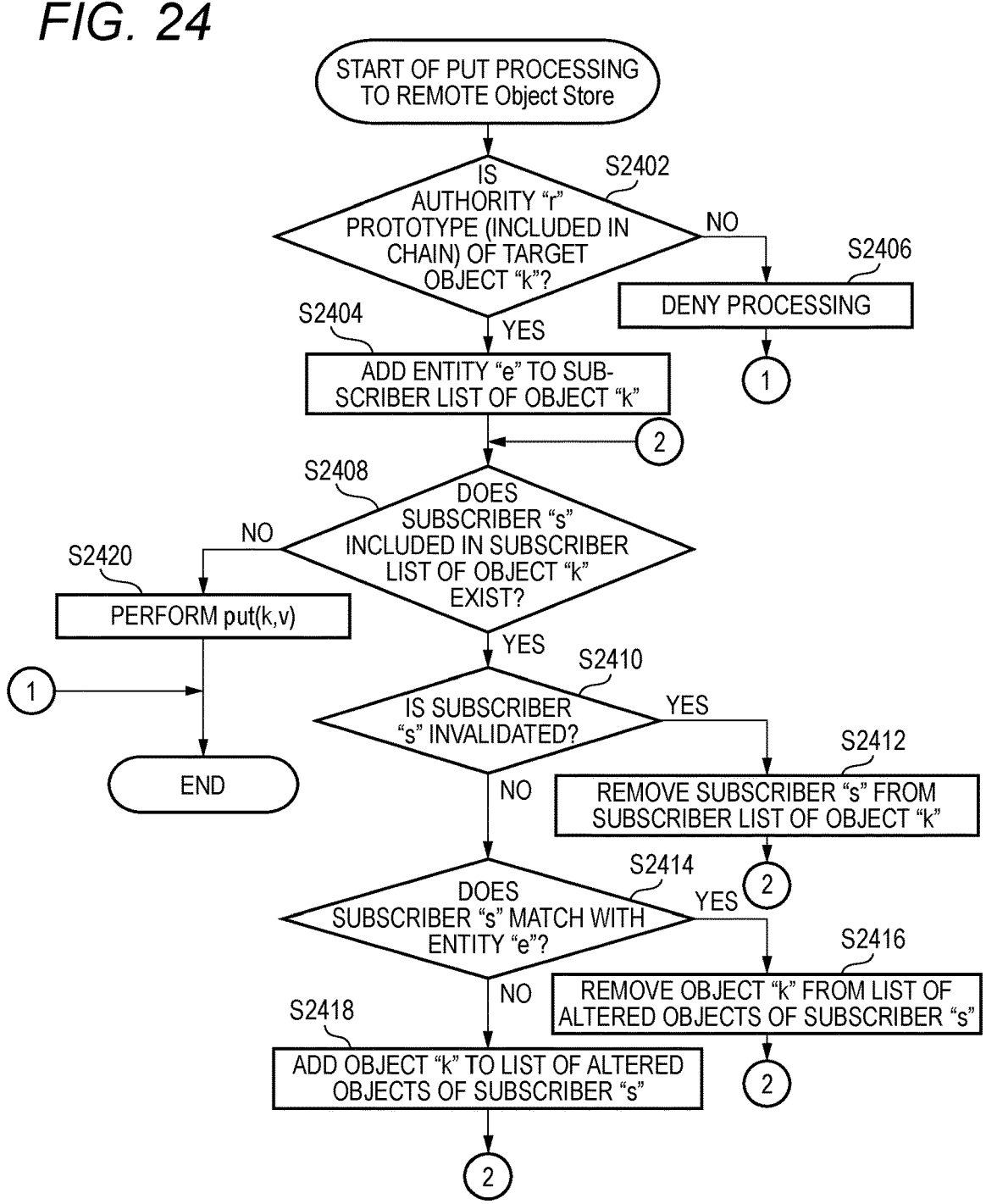
FIG. 24 is a flowchart illustrating still another example of processing performed by the exemplary embodiment.

FIG. 24 is a flowchart illustrating an example of processing (processing of PUT to an "object Store" of a remote side) performed by the exemplary embodiment. The example of the processing corresponds to the put processing of the "put (k, v)" described above. The entity "e" performs the put (k, v) with the authority "r". In the following, although the "r", "e", and "k" are identifiers exactly, for the convenience of explanation, the "r", "e", and "k" are handled as the objects indicated by the identifiers. Here, the "k" is a target object for the CRUD.

The PUT processing to the remote Object Store is started, and in Step S2402, it is determined whether the authority "r" is a prototype (included in a chain) of the target object "k" or not. In a case where the authority "r" is the prototype, the processing proceeds to Step S2404 and otherwise, the processing proceeds to Step S2406.

In Step S2404, the entity "e" is added to the subscriber list of the object "k".

In Step S2406, the processing is denied, and is ended.

In Step S2408, it is determined whether a subscriber "s" included in the subscriber list of the object "k" exists or not. In a case where the subscriber "s" exists, the processing proceeds to Step S2410 and otherwise, the processing proceeds to Step S2420.

In Step S2410, it is determined whether the subscriber "s" is invalidated or not. In a case where the subscriber "s" is invalidated, the processing proceeds to Step S2412 and otherwise, the processing proceeds to Step S2414.

In Step S2412, the subscriber "s" is removed from the subscriber list of the object "k" and the processing is returned to Step S2408.

In Step S2414, it is determined whether the subscriber "s" matches with the entity "e". In a case where the subscriber "s" matches with the entity "e", the processing proceeds to Step S2416 and otherwise, the processing proceeds to Step S2418.

In Step S2416, the object "k" is removed from the list of the altered objects of the subscribers "s" and the processing is returned to Step S2408.

In Step S2418, the object "k" is added to the list of the altered objects of the subscribers "s" and the processing is returned to Step S2408.

In Step S2420, the put(k,v) is performed.

Figure 25:
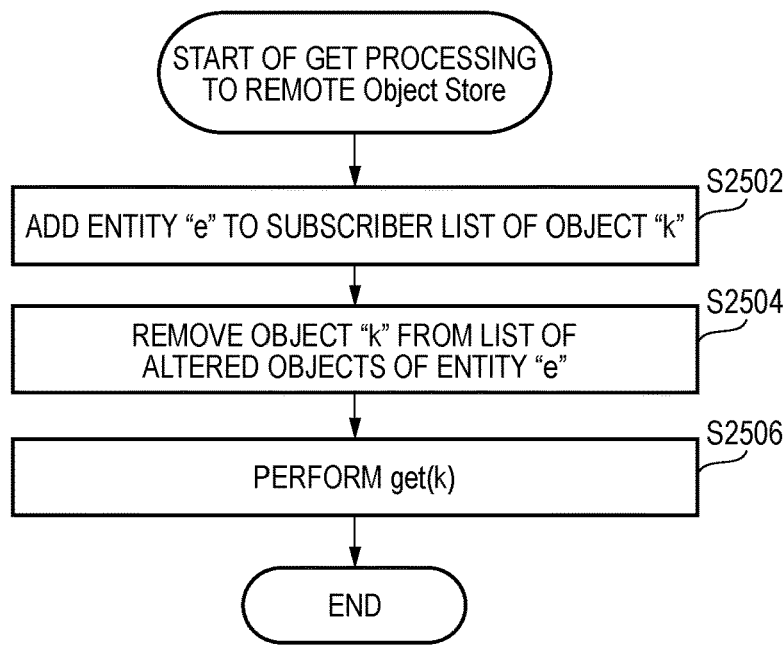
FIG. 25 is another flowchart illustrating still another example of processing performed by the exemplary embodiment.

FIG. 25 is another flowchart illustrating the example of processing (processing of GET to an "object Store" of a remote side) performed by the exemplary embodiment. The example of the processing corresponds to the get processing of the "get (k, v)" described above. The entity "e" performs the get(k, v) with the authority "r". In the following, although the "r", "e", and "k" are identifiers exactly, for the convenience of explanation, the "r", "e", and "k" are handled as the objects indicated by the identifiers. Here, the "k" is a target object for the CRUD.

The GET processing to the remote Object Store is started, and in Step S2502, the entity "e" is added to the subscriber list of the object "k".

In Step S2504, the object "k" is removed from the subscriber list of the altered objects of the entity "e".

In Step S2506, the get(k) is performed.

Figure 26:
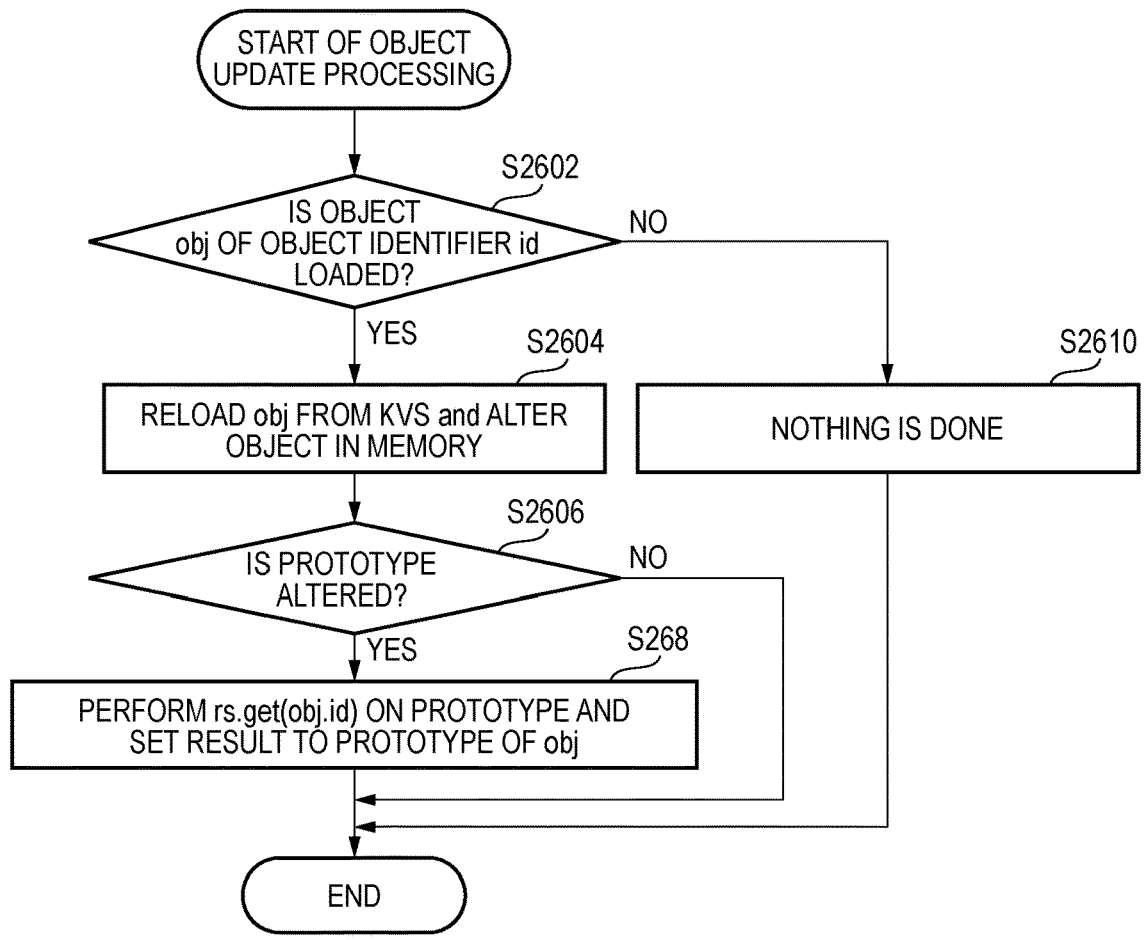
FIG. 26 is a flowchart illustrating still another example of processing performed by the exemplary embodiment.

FIG. 26 is a flowchart illustrating another example of processing (object update processing (processing of loading from a persistent layer to a memory)) performed by the exemplary embodiment. The example of the processing corresponds to the "rs.down (id)" processing described above. When the object obj designated by an id is loaded, the object obj is reloaded from the KVS. When the object obj is not loaded, nothing is done.

The object update processing is started, and in Step S2602, it is determined whether the object obj of the object identifier id is loaded or not. In a case where the object obj is loaded, the processing proceeds to Step S2604 and otherwise (in a case where the object obj of the object identifier id is not loaded), the processing proceeds to Step S2610.

In Step S2604, the obj is reloaded from a KVS and the object in the memory is altered.

In Step S2606, it is determined whether the prototype is altered or not. In a case where the prototype is altered, the processing proceeds to Step S2608 and otherwise, the processing is ended.

In Step S2608, the rs.get (obj.id) is performed on the prototype and the result is set to the prototype of the obj.

In Step S2610, nothing is done and the processing is ended.

Figure 27:
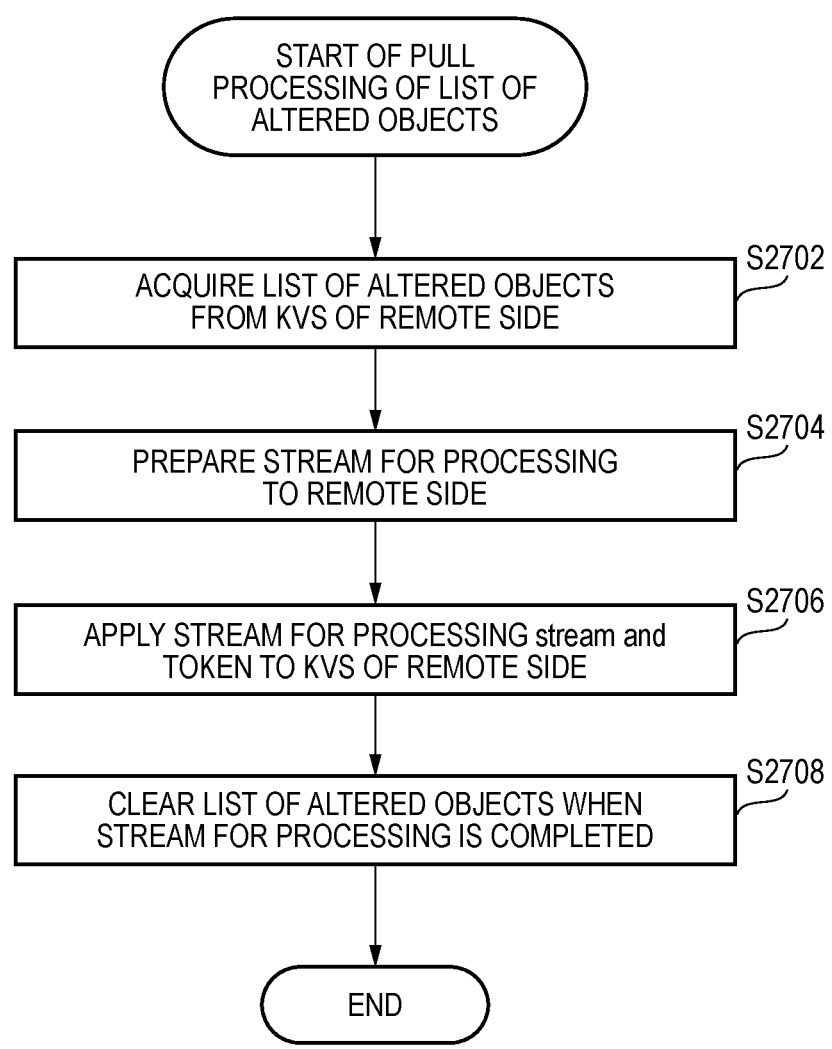
FIG. 27 is a flowchart illustrating still another example of processing performed by the exemplary embodiment.

FIG. 27 is a flowchart illustrating another example of processing (pull processing of the list of the altered objects) performed by the exemplary embodiment. The example of the processing corresponds to the "rs.pull ( )" processing described above. The cluster of objects which are cached in the KVS of a local side and alterations is not yet reflected in a remote side are reflected into the KVS of a local side.

The pull processing of the list of the altered objects is started, and in Step S2702, the list of the altered objects is acquired from the KVS of a remote side.

In Step S2704, a stream for processing stream to a remote side is prepared. For example, the object included in the list of the altered objects is acquired.

In Step S2706, the stream for processing and the token are applied to the KVS of a remote side.

In Step S2708, when the stream for processing is completed, the list of altered objects is cleared.

Next, description will be made on mapping processing to a file system in the exemplary embodiment. Specifically, the mapping processing is related to processing for creating or managing of the local repository.

Figure 28:
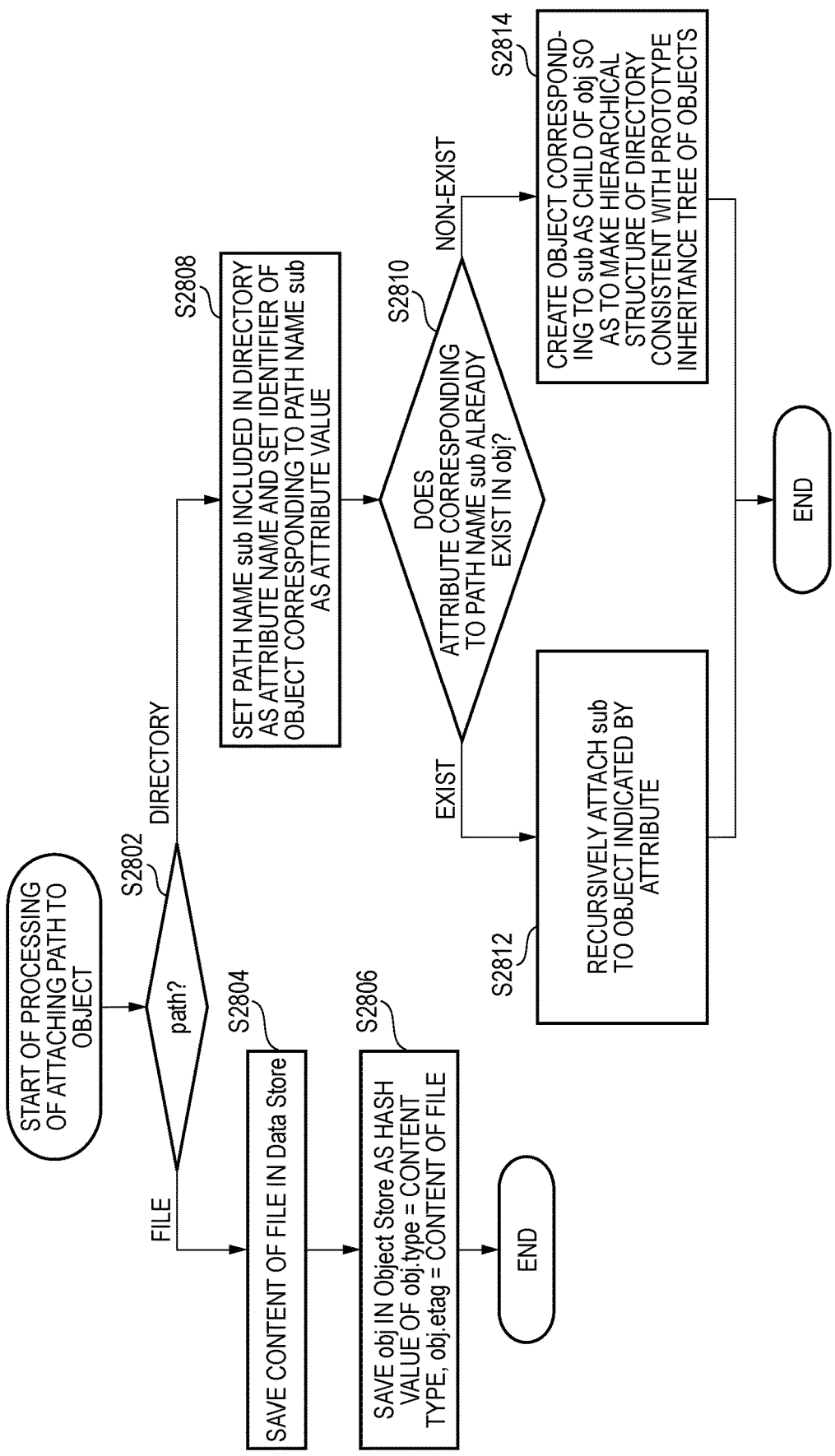
FIG. 28 is a flowchart illustrating still another example of processing performed by the exemplary embodiment.

FIG. 28 is a flowchart illustrating another example of processing (processing of attaching a path to the object) performed by the exemplary embodiment. The processing of attaching corresponds to "attachPath (obj, path)" processing. A path on the file system is attached to the object obj.

A file is represented as an object having an attribute expressed as: {type: {content type}, etag: {hash value}}

If the attribute includes foo, bar, and buz, a directory is represented as an object having an attribute expressed as: {foo: {identifier of object indicating foo}, bar: {identifier of object indicating bar}, bar: {identifier of object indicating baz}}.

The processing of attaching a path to the object is started, and in Step S2802, it is determined whether the path is a file or a directory. In a case where the path is the file, the processing proceeds to Step S2804 and otherwise, the processing proceeds to Step S2808.

In Step S2804, the content of the file is saved in Data Store.

In Step S2806, the obj is set to the Object Store as a hash value of obj.type=content type, obj.etag=content of file.

In Step S2808, sub which is a name of the path included in the directory is set as an attribute name and an identifier of the object corresponding to the path name sub is set as an attribute value.

In Step S2810, it is determined whether an attribute corresponding to the path name sub already exists in the obj or not. In a case where the attribute exists in the obj, the processing proceeds to Step S2812 and otherwise, the processing proceeds to Step S2814.

In Step S2812, the sub is recursively attached to the object indicated by the attribute.

In Step S2814, the object corresponding to the sub is created as a child of the obj so as to make a hierarchical structure of the directory consistent with a prototype inheritance tree of the objects.

Figure 29:
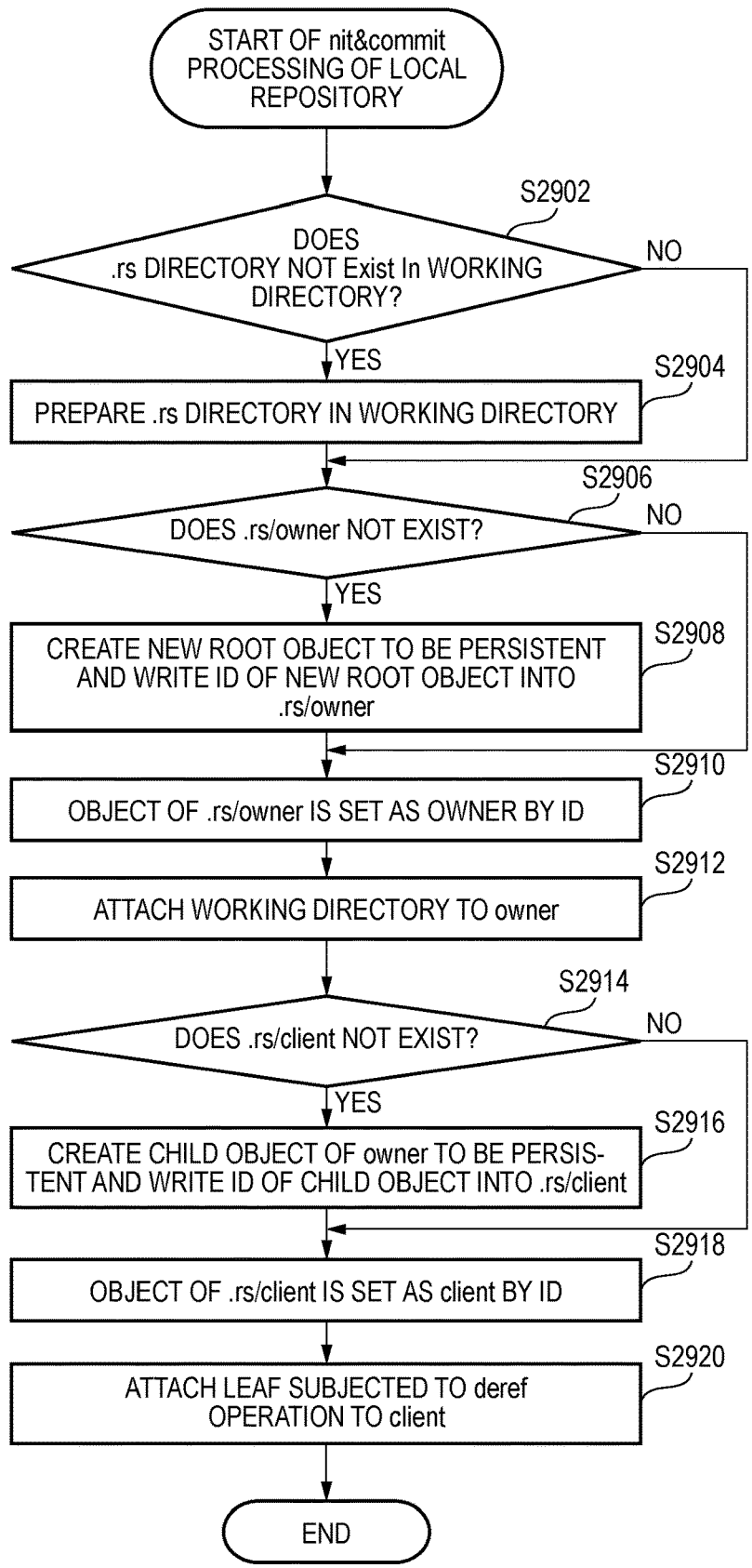
FIG. 29 is a flowchart illustrating still another example of processing performed by the exemplary embodiment.

FIG. 29 is a flowchart illustrating another example of processing (init and commit of a local repository) performed by the exemplary embodiment. A current directory is initialized to or reflected into a local repository of a single working directory. When the "rs commit" is set by a command tool, in a case where a rs directory is not reflected into the working directory, the rs directory is added and a current directory is committed to the local repository.

The init & commit processing of the local repository is started, and in Step S2902, it is determined whether the ".rs" directory exists in the working directory. In a case where the ".rs" directory does not exist, the processing proceeds to Step S2904 and otherwise, the processing proceeds to Step S2906.

In Step S2904, the ".rs" directory is prepared in the working directory. In Step S2906, it is determined whether the ".rs/owner" exists or not. In a case where the ".rs/owner" does not exist, the processing proceeds to Step S2908 and otherwise, the processing proceeds to Step S2910.

In Step S2908, a new root object is created and is made persistent and an ID of the new root object is written into the ".rs/owner".

In Step S2910, an object of the ".rs/owner" is set as an owner by the ID.

In Step S2912, a working directory is attached to the owner.

In Step S2914, it is determined whether the ".rs/client" exists or not. In a case where the ".rs/client" does not exist, the processing proceeds to Step S2916 and otherwise, the processing proceeds to Step S2918.

In Step S2916, a child object of the owner is created and is made persistent and an ID of the child object is written into the ".rs/client".

In Step S2918, an object of the ".rs/client is set as an owner by the ID.

In Step S2920, a leaf subjected to deref operation is attached to the client. That is, in a case of a structure called a foo/bar/buz, client={'foo/bar/buz': IDZ of object buz}.

The object capable of being attached is nested and thus, the keys are deployed and the leaves are lined up.

Next, Description will be made on REST API of a file system.

Specifically, description will be made on opening processing of a local repository.

When a "rs publish" is set by a command tool, a "http server" which uses a working directory as a starting point is started. It is regarded that the working directory is already subjected to the "rs commit".

The local REST API server described above is started such that the API may be used similarly as in a shared public server without imposing load on the public server. Data and a scope are developed and tested in a local environment and the rs.push ( ) is performed after completion of the development and test thereby, capable of being deployed in the shared public server. Updating of the data and the scope is also possible.

Specifically, a resource management-based REST API service described in JP-A-2015-162057 is started in a local side.

More specifically, the resource management-based REST API service is implemented by an information processing system A.

The information processing system A which includes a management unit that manages information of an object of which at least one of a parent or a child is determined, a receiving unit that receives a request which includes a designation of an authority object, which is an object, associated with authority information and is for processing a process, an acquiring unit that acquires a function object associated with the authority object, and a processing unit that processes the request by the function object is used.

The information processing system A includes a determination unit that determines whether the request is to be received or not based on a comparison result between an owner object, which is an object for which the information of authority information is authorized, and information of an object which is a parent of the authority object, and in a case where it is determined that the request is to be received, the processing unit may process the request by the function object.

In a case where the owner object, which is an object for which the authority information is authorized, matches with an object which is the parent of the authority object, the determination unit may receive the request.

In a case where an object which is a parent of the authority object is included in a path in which an object which is a parent of the owner object, which is an object for which the information of authority information is authorized, and an object which is a parent of the parent of the owner object are sequentially connected, the determination unit may receive the request.

In a case where the authority object is not managed by the management unit, the determination unit may not receive the request.

In a case where the authority object does not include an owner object, which is an object for which the authority information is authorized, a client object which is an object indicating a transfer destination of the authority information, and data which designates functions of which execution is permitted by the authority information, the determination unit may not receive the request.

The information processing system A may include a unit that registers a data object including a source code of a function and a unit that creates an authority object including information which designates a given owner object, a given client object, and the data object.

In a case where the function object is not able to be created based on the source code of the function included in data object designated by information included in the authority object, the information processing system A may not receive the request.

The acquiring unit may acquire a function object created based on the source code of the function included in the object for which processing is designated and is included in the authority object.

Here, a child object a user of the an object client having a value of the ".rs/client" as an ID may created for anonymous accesses (that is, access by which an OAuth2.0 access token as well as a cookie are not designated) and an access token having the following contents may be issued.

{owner: client.id,client: aUser.id, scope: readOnly.id}

Figure 30:
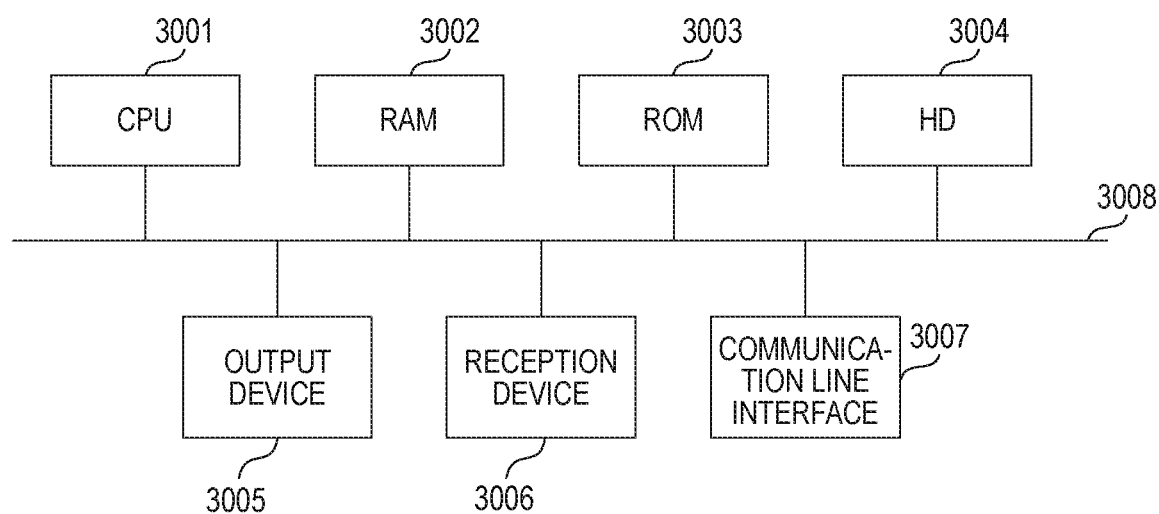
FIG. 30 is a block diagram illustrating an example of a hardware configuration of a computer that implements the exemplary embodiment.

A hardware configuration of a computer, which executes a program, as the present exemplary embodiment is a general computer, specifically, a personal computer or a computer capable of becoming a server, as illustrated in FIG. 30. That is, as a specific example, a CPU 3001 is used as a processing unit (operation unit), a RAM 3002, a ROM 3003, and an HD 3004 are used as a storage device. For example, a hard disk or a solid state drive (SSD) may be used as the HD 3004. The computer is configured by the CPU 3001 that executes programs such as the request reception module 120, the authority object verification module 130, the object management module 140, the delivery-object generation module 141, the request processing module 150, the processing result provision module 160, or the like, the RAM 3002 in which the program or data is stored, the ROM 3003 in which a program used for starting the computer of the present exemplary embodiment is stored, the HD 3004 which is an auxiliary storage device (which may be a flash memory or the like) having functions of the data storage module 110, the object management table 111, and the value management table 112, a reception device 3006 that receives data based on the operation of a keyboard, a mouse, a touch screen, a microphone or the like by a user, an output device 3005 such as a CRT, a liquid crystal device, a speaker or the like, a communication line interface 3007 for connecting with a communication network interface card or the like, and a bus 3008 for connecting the components described above and used for exchanging data between the components. Plural computers each of which is configured by the components may be connected with each other through a network.

Regarding matters corresponding to the computer program of the exemplary embodiments described above, a computer program which is software is read into a system having a hardware configuration of the present exemplary embodiment, and software resources and hardware resources are cooperated with each other to implement the exemplary embodiment described above.

The hardware configuration of the information processing apparatus illustrated in FIG. 30 illustrates just one configuration example, the present exemplary embodiment is not limited to the configuration illustrated in FIG. 30, and may be a configuration in which the modules described in the present exemplary embodiment are adapted to be executable. For example, some of the modules may be configured by exclusive hardware (for example, an application specific integrated circuit (ASIC) or the like), some of the modules may be adapted to be connected by the communication line placed within an external system. Furthermore, plural systems each of which is illustrated in FIG. 30 may be connected to each other by the communication line to be cooperated with each other. In particular, the system may be incorporated into a portable information communication device (including a mobile phone, a smart phone, a mobile device, a wearable computer or the like), home information appliances, a robot, a copy machine, a facsimile, a scanner, a printer, a multifunction machine (image processing apparatus equipped with functions of two or more of a scanner, a printer, a copy machine, a facsimile or the like), in addition to the personal computer.

The program described above may be provided in a state of being stored in a recording medium or be provided by a communication unit. In this case, for example, the program described above may be considered as an invention of a "computer readable recording medium having a program recorded therein".

The "computer readable recording medium having a program recorded therein" refers to a recording medium used for installation, execution, distribution or the like of the program, having recorded a program therein, and is readable by a computer.

The recording medium may include, for example, a digital versatile disk (DVD) such as "DVD-R, DVD-RW, DVD-RAM, or the like" that are standards formulated by the DVD forum, "DVD+R, DVD+RW, or the like" that are standards formulated by the DVD+RW, a compact disk (CD) such as a CD-read only memory (CD-ROM), a CD-recordable (CD-R), a CD-rewritable (CD-RW) or the like, a Blu-ray Disc, a magnetooptical disc (MO), a flexible disk (FD), a magnetic tape, a hard disk, a read-only memory (ROM), an electrically erasable programmable read-only memory (EEPROM (registered trademark)), a flash memory, a random access memory (RAM), a secure digital (SD) memory card, or the like.

A portion or the entirety of the program may be recorded in the recording medium to be saved, distributed or the like. The portion or the entirety of the program may be transmitted, by communication, using a transmission medium such as a wired communication network, a wireless communication network, and a combination of the wired communication network and the wireless communication network, that are used, for example, in a local area network (LAN), a metropolitan area network (MAN), a wide area network (WAN), the Internet, the Ethernet, and an extra network, or may be carried by being superposed on a carrier wave.

Furthermore, the program may be a portion or the entirety of another program or may be recorded in the recording medium together with a separate program. The program may be divided to be recorded in plural recording media. The program may be recorded in any format such as a compressed format, an encrypted format, or the like as long as the program is able to be restored.

The exemplary embodiments may be grasped as follows. The exemplary embodiments may also be allowed to be combined.

[A] An information processing system which includes a management unit that manages information of an object of which at least one of a parent or a child is determined, a receiving unit that receives a request which includes a designation of an authority object, which is an object, associated with authority information, and requests for reading an object to be provided managed by the management unit, a providing unit that provides information of the object to be provided based on a comparison result in authority between an owner object which is an object for which the information of authority information is authorized, and information of an object which is a parent of the authority object, and the providing unit provides information of a data item of an ancestor object included in a chain in which a parent of the object to be provided and a parent of the parent of the object to be provided are recursively traversed to a data item that does not have the object to be provided.

[B] In the information processing system described in [A], the providing unit provides information of the item included in the object to be provided to an item, which matches with an item included in the object to be provided, of the items included in the ancestor object.

[C] In the information processing system described in [A] or [B], in a case where a request which includes a designation of an authority object, which is an object associated with authority information, and requests for creation of a child object of the ancestor object is received, the receiving unit further includes a creation unit that creates the object to be provided as a child object of the ancestor object based on a comparison result in authority between an owner object which is an object for which the authority information is authorized and an object which is a parent of the authority object.

[D] The information processing system described in any one of [A] to [C] further includes a unit that invalidates the object to be provided based on a first authority object that has a creation authority for the object to be provided which becomes a child of the ancestor object and a second authority object that has an update authority for the object to be provided.

[E] In the information processing system described in any one of [A] to [D], in a case where an instruction to freeze the update of information of the object to be provided is received, the information of the object to be provided is fixed to information received at the time of receiving the instruction to freeze.

[F] In the information processing system described in [E], in a case where an instruction to release freezing of the update is received after the instruction to freeze is received, the information of the object to be provided is updated based on the information of the ancestor object.

[G] The information processing system described in [D] further includes a unit that adds processing to the object to be provided based on second authority object.

[H] In the information processing system described in any one of [A] to [G], the creation unit creates an object to be provided which is a child of the ancestor object for each of plural provision destinations.

[I] In the information processing system described in [D], the providing unit provides the information of the object to be provided and the second authority object to the provision destination.

[J] In the information processing system described in [C], in a case where an object which is a parent of the first authority object is included in a path in which an object which is a parent of the owner object of first authority object and an object which is a parent of the parent of the owner object are sequentially connected, the creation unit creates the object to be provided.

[K] In the information processing system described in [C], in a case where the first authority object is not managed by the management unit, the creation unit does not create the object to be provided.

[L] In the information processing system described in any one of [A] to [K], in a case where the owner object which is an object for which the authority information is authorized matches with the object which is a parent of the authority object, the providing unit provides information of the object to be provided.

[M] In the information processing system described in any one of [A] to [L], in a case where an object which is a parent of the authority object is included in a path in which an owner object which is an object for which the authority information is authorized and an object which is a parent of the parent of the owner object are sequentially connected, the providing unit provides information of the object to be provided.

[N] A program which causes a computer to function as: a management unit that manages information of an object of which at least one of a parent or a child is determined, a receiving unit that receives a request which includes a designation of an authority object, which is an object associated with authority information, and requests for reading an object to be provided managed by the management unit, a providing unit that provides information of the object to be provided based on a comparison result in an authority between an owner object, which is an object for which the information of authority information is authorized, and information of an object which is a parent of the authority object, and the providing unit is caused to provide information of a data item of an ancestor object included in a chain in which a parent of the object to be provided and a parent of the parent of the object to be provided are recursively traversed to a data item that does not have the object to be provided.

The constitutions described in [A] to [N] have the following effects.

According to the constitutions described in [A] to [N], it is possible to individually control contents to be provided to a single piece of master data.

According to the constitutions described in [B], it is possible to individually set contents of data to be provided in accordance with contents of a data item of a descendent object.

According to the constitutions described in [C], it is possible to create a descendent object of the master data.

According to the constitutions described in [D], it is possible to individually invalidate the object in accordance with a provision destination.

According to the constitutions described in [E], it is possible to freeze contents of an individual object of the provision destination so as not to be altered regardless of alteration of the object which is referred to by the individual object of the provision destination.

According to the constitutions described in [F], it is possible to release freezing of the contents of an individual object of the provision destination.

According to the constitutions described in [G], it is possible to add processing to an individual object of the provision destination.

According to the constitutions described in [H], it is possible to set an individual object to each of plural provision destinations.

According to the constitutions described in [I], it is possible to authorize update of an individual object provided to the provision destination.

According to the constitutions described in [J] to [M], in a case where a proper authority is permitted, it is possible to authorize creation of contents to be individually set to the provision destination and provision of contents information.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a processor programmed to:
        manage information of an object, of which at least one of a parent or a child is determined, by a first memory within the information processing apparatus;
        manage information of an object, of which at least one of a parent or a child is determined, by a second memory that is located in another information processing apparatus and is accessible from a plurality of information processing apparatuses, the information managed by the first memory having at least a part in common with the information managed by the second memory;
        receive a request which includes a designation of an authority object, which is an object associated with authority information, and is intended for a target object managed in the first memory or the second memory;
        perform processing corresponding to the request on information of the target object based on a comparison result in authority between an owner object which is an object for which the authority information is authorized and an object which is a parent of the authority object;
        in a case where the request corresponds to creation processing, update processing, or discarding processing of information of an object, without designating a location of the object, automatically choose the first memory to perform processing corresponding to the request on the information in the first memory; and
        in a case where the request corresponds to processing for reflecting information, which is created, updated, or discarded, in the first memory into the second memory, perform the processing for reflecting on the information in the second memory.

2. The information processing apparatus according to claim 1, wherein the processor is further programmed to:
    prohibit alteration of information of a descendent object of an object in a case where the request is for prohibition of alteration of information of the object.

3. The information processing apparatus according to claim 2, wherein:
    alteration of information of an object in the first memory is prohibited before writing of information of a corresponding object in the second memory is started; and
    the prohibition of alteration of the object in the first memory is released when the writing is completed.

4. The information processing apparatus according to claim 1, wherein the processor is further programmed to:
    store a user who performs the request for the information of the object in the second memory; and
    notify the user that an alteration of the information of the object is performed in a case where an alteration is performed on the information of the object in the second memory.

5. The information processing apparatus according to claim 2, wherein the processor is further programmed to:
    store a user who performs the request for the information of the object in the second memory; and
    notify the user that an alteration of the information of the object is performed in a case where an alteration is performed on the information of the object in the second memory.

6. The information processing apparatus according to claim 3, wherein the processor is further programmed to:
    store a user who performs the request for the information of the object in the second memory; and
    notify the user that an alteration of the information of the object is performed in a case where an alteration is performed on the information of the object in the second memory.

7. A non-transitory computer readable medium storing a program causing a computer to:
    manage information of an object, of which at least one of a parent or a child is determined, by a first memory within the computer;
    manage information of an object, of which at least one of a parent or a child is determined, by a second memory that is located in another computer and is accessible from a plurality of information processing apparatuses, the information managed by the first memory having at least a part in common with the information managed by the second memory;
    receive a request which includes a designation of an authority object, which is an object associated with authority information, and is intended for a target object managed in the first memory or the second memory; and perform processing corresponding to the request on information of the target object based on a comparison result in authority between an owner object which is an object for which the authority information is authorized and an object which is a parent of the authority object;

in a case where the request corresponds to creation processing, update processing, or discarding processing of information of an object, without designating a location of the object, automatically choose the first memory to perform processing corresponding to the request on the information in the first memory; and in a case where the request corresponds to processing for reflecting information, which is created, updated, or discarded, in the first memory into the second memory, perform the processing for reflecting on the information in the second memory.

* * * * *